(12) United States Patent
Pelletier et al.

(10) Patent No.: US 11,044,675 B2
(45) Date of Patent: Jun. 22, 2021

(54) METHODS, APPARATUSES AND SYSTEMS FOR ADAPTIVE UPLINK POWER CONTROL IN A WIRELESS NETWORK

(71) Applicant: IDAC Holdings, Inc., Wilmington, DE (US)

(72) Inventors: Ghyslain Pelletier, Montréal (CA); Paul Marinier, Brossard (CA)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/274,235

(22) Filed: Feb. 12, 2019

(65) Prior Publication Data
US 2019/0253976 A1  Aug. 15, 2019

Related U.S. Application Data

(60) Provisional application No. 62/630,222, filed on Feb. 13, 2018.

(51) Int. Cl.
*H04W 52/12* (2009.01)
*H04W 52/14* (2009.01)
(Continued)

(52) U.S. Cl.
CPC ....... *H04W 52/146* (2013.01); *H04W 52/242* (2013.01); *H04W 52/346* (2013.01); *H04W 52/367* (2013.01); *H04W 52/34* (2013.01)

(58) Field of Classification Search
CPC ............. H04W 52/146; H04W 52/242; H04W 52/346; H04W 52/367; H04W 52/34
(Continued)

(56) References Cited

U.S. PATENT DOCUMENTS

| 8,155,649 B2 * | 4/2012 | McHenry | H04W 16/14 455/434 |
| 8,326,313 B2 * | 12/2012 | McHenry | H04W 16/14 455/454 |

(Continued)

FOREIGN PATENT DOCUMENTS

WO  WO-2016/047747  3/2016

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.2.1, Mar. 2017, 106 pages.

(Continued)

*Primary Examiner* — Hai V Nguyen
(74) *Attorney, Agent, or Firm* — Julian F. Santos

(57) ABSTRACT

Methods, apparatuses, and systems directed to adaptive uplink power control in a wireless network are provided. Among the apparatuses is a wireless transmit/receive unit that may include any of a receiver, a transmitter, and a processor coupled to the receiver and the transmitter. The processor may identify, from a plurality of transmissions, a first group of transmissions for transmission during a first transmission opportunity of a first uplink. The processor may determine a first power level for the first group of transmissions based, at least in part, on a characteristic of the first transmission opportunity and a characteristic of a second transmission opportunity of a second uplink, wherein the second transmission opportunity may be usable for transmission of a second group of the plurality of transmissions. The first and second characteristics may define respective time resources, where at least some of the first and second time resources overlap. The transmitter may transmit (Continued)

the first group of transmissions at least at the first power level.

20 Claims, 11 Drawing Sheets

(51) Int. Cl.
  *H04W 52/24* (2009.01)
  *H04W 52/36* (2009.01)
  *H04W 52/34* (2009.01)

(58) Field of Classification Search
  USPC .......................................................... 455/522
  See application file for complete search history.

(56) References Cited

U.S. PATENT DOCUMENTS

| | | | | |
|---|---|---|---|---|
| 8,594,028 | B2* | 11/2013 | Mark | H04W 52/146 370/329 |
| 8,818,283 | B2* | 8/2014 | McHenry | H04W 16/14 455/62 |
| 9,538,388 | B2* | 1/2017 | McHenry | H04L 27/0006 |
| 9,585,103 | B2* | 2/2017 | Chen | H04W 52/146 |
| 9,743,363 | B2* | 8/2017 | Dabeer | H04W 52/246 |
| 9,844,057 | B2* | 12/2017 | Gaal | H04W 16/14 |
| 10,015,778 | B2* | 7/2018 | Yang | H04W 16/14 |
| 10,098,075 | B2* | 10/2018 | Wang | H04W 52/06 |
| 10,111,190 | B2* | 10/2018 | Pelletier | H04W 72/0446 |
| 10,117,261 | B2* | 10/2018 | Liu | H04W 72/1226 |
| 10,154,466 | B2* | 12/2018 | Dinan | H04L 5/001 |
| 10,158,473 | B2* | 12/2018 | Bashar | H04L 1/1893 |
| 10,159,049 | B2* | 12/2018 | Dabeer | H04W 74/0808 |
| 10,171,276 | B2* | 1/2019 | Stern-Berkowitz | H04W 72/1215 |
| 10,187,187 | B2* | 1/2019 | Dinan | H04L 5/0048 |
| 10,187,900 | B2* | 1/2019 | Zhang | H04W 72/1263 |
| 10,194,432 | B2* | 1/2019 | Dinan | H04L 27/0006 |
| 10,200,904 | B2* | 2/2019 | Zhang | H04W 24/08 |
| 10,251,155 | B2* | 4/2019 | Gupta | H04W 72/005 |
| 10,251,184 | B2* | 4/2019 | Moon | H04W 72/0446 |
| 10,285,068 | B2* | 5/2019 | Hugl | H04L 5/00 |
| 10,342,044 | B2* | 7/2019 | Yerramalli | H04W 74/0808 |
| 10,367,677 | B2* | 7/2019 | Parkvall | H04J 11/0059 |
| 10,375,739 | B2* | 8/2019 | Einhaus | H04W 52/0216 |
| 10,383,147 | B2* | 8/2019 | Rajagopal | H04W 28/0284 |
| 10,383,150 | B2* | 8/2019 | Babaei | H04W 72/042 |
| 10,404,417 | B2* | 9/2019 | Feng | H04L 1/1861 |
| 10,412,689 | B2* | 9/2019 | Rahman | H04W 56/0005 |
| 10,420,033 | B2* | 9/2019 | Dinan | H04W 52/367 |
| 10,420,040 | B2* | 9/2019 | Dinan | H04W 52/146 |
| 10,420,165 | B2* | 9/2019 | Dinan | H04W 52/365 |
| 10,425,857 | B2* | 9/2019 | Matsumoto | H04W 84/12 |
| 10,433,266 | B2* | 10/2019 | Ahn | H04W 72/0446 |
| 10,433,347 | B2* | 10/2019 | Mukherjee | H04L 5/001 |
| 10,455,455 | B2* | 10/2019 | Yoo | H04W 74/0816 |
| 10,531,453 | B2* | 1/2020 | Chen | H04L 5/0044 |
| 10,548,143 | B2* | 1/2020 | Falconetti | H04B 17/345 |
| 2010/0075704 | A1* | 3/2010 | McHenry | H04B 7/022 455/509 |
| 2010/0097952 | A1* | 4/2010 | McHenry | H04W 16/14 370/252 |
| 2010/0105332 | A1* | 4/2010 | McHenry | H04W 16/14 455/62 |
| 2010/0142458 | A1* | 6/2010 | Mark | H04L 5/0073 370/329 |
| 2010/0173586 | A1* | 7/2010 | McHenry | H04L 27/0006 455/62 |
| 2011/0003611 | A1 | 1/2011 | Haas et al. | |
| 2013/0016649 | A1* | 1/2013 | Damnjanovic | H04W 88/04 370/315 |
| 2013/0017794 | A1* | 1/2013 | Kloper | H04W 74/0808 455/63.1 |
| 2013/0021932 | A1* | 1/2013 | Damnjanovic | H04W 52/0229 370/252 |
| 2013/0176953 | A1 | 7/2013 | Stern-Berkowitz et al. | |
| 2013/0195073 | A1* | 8/2013 | Chen | H04L 5/0032 370/331 |
| 2013/0343288 | A1* | 12/2013 | Ratasuk | H04W 52/38 370/329 |
| 2014/0341018 | A1* | 11/2014 | Bhushan | H04W 48/10 370/230 |
| 2015/0057011 | A1* | 2/2015 | Di Girolamo | H04W 74/0808 455/454 |
| 2015/0092758 | A1* | 4/2015 | Chen | H04W 16/14 370/336 |
| 2015/0110066 | A1* | 4/2015 | Gaal | H04W 16/14 370/330 |
| 2015/0208358 | A1 | 7/2015 | Ahn et al. | |
| 2015/0215874 | A1* | 7/2015 | Chen | H04W 52/16 455/522 |
| 2015/0223075 | A1* | 8/2015 | Bashar | H04W 16/14 370/329 |
| 2015/0373652 | A1* | 12/2015 | Dabeer | H04W 52/241 455/522 |
| 2016/0044606 | A1 | 2/2016 | Yin | |
| 2016/0099799 | A1* | 4/2016 | Bashar | H04L 5/0007 370/280 |
| 2016/0100407 | A1* | 4/2016 | Gaal | H04L 5/0041 370/329 |
| 2016/0105897 | A1* | 4/2016 | Liu | H04W 72/1226 370/235 |
| 2016/0119971 | A1* | 4/2016 | Bachu | H04W 76/00 370/328 |
| 2016/0174078 | A1* | 6/2016 | Salem | H04W 28/26 370/329 |
| 2016/0381589 | A1* | 12/2016 | Zhang | H04L 5/001 370/252 |
| 2017/0149543 | A1* | 5/2017 | Ang | H04L 5/0053 |
| 2017/0188391 | A1* | 6/2017 | Rajagopal | H04W 74/0816 |
| 2017/0223677 | A1* | 8/2017 | Dinan | H04L 27/0006 |
| 2017/0230917 | A1 | 8/2017 | Ouchi et al. | |
| 2017/0230986 | A1* | 8/2017 | Moon | H04W 74/08 |
| 2017/0280441 | A1* | 9/2017 | Shimezawa | H04W 72/0446 |
| 2017/0295576 | A1* | 10/2017 | Fukuta | H04W 16/14 |
| 2017/0303220 | A1* | 10/2017 | Sadeghi | H04L 5/0053 |
| 2017/0331577 | A1* | 11/2017 | Parkvall | H04J 11/0079 |
| 2017/0331670 | A1* | 11/2017 | Parkvall | H04W 24/10 |
| 2017/0332358 | A1* | 11/2017 | Park | H04W 72/042 |
| 2017/0332410 | A1* | 11/2017 | Babaei | H04B 17/318 |
| 2017/0339648 | A1* | 11/2017 | Wang | H04W 52/38 |
| 2017/0347326 | A1* | 11/2017 | Dinan | H04W 52/242 |
| 2017/0347340 | A1* | 11/2017 | Haley | H04L 25/03343 |
| 2017/0367058 | A1* | 12/2017 | Pelletier | H04W 56/0045 |
| 2017/0374628 | A1* | 12/2017 | Dabeer | H04W 52/246 |
| 2018/0027554 | A1* | 1/2018 | Yerramalli | H04L 1/0013 370/329 |
| 2018/0027590 | A1* | 1/2018 | Yerramalli | H04W 76/28 370/328 |
| 2018/0035463 | A1* | 2/2018 | Mallik | H04W 74/0816 |
| 2018/0048498 | A1* | 2/2018 | Stern-Berkowitz | H04W 16/14 |
| 2018/0049206 | A1* | 2/2018 | Yerramalli | H04W 72/0413 |
| 2018/0054784 | A1* | 2/2018 | Yi | H04W 52/34 |
| 2018/0092051 | A1* | 3/2018 | Dinan | H04W 72/0406 |
| 2018/0110084 | A1* | 4/2018 | Dinan | H04W 52/0216 |
| 2018/0132140 | A1* | 5/2018 | Yoo | H04W 72/0453 |
| 2018/0132261 | A1* | 5/2018 | Zhang | H04W 72/1231 |
| 2018/0160437 | A1* | 6/2018 | Montojo | H04W 72/0473 |
| 2018/0227882 | A1* | 8/2018 | Freda | H04W 72/085 |
| 2018/0227912 | A1* | 8/2018 | Chen | H04L 5/001 |
| 2018/0242264 | A1* | 8/2018 | Pelletier | H04W 52/346 |
| 2018/0242357 | A1* | 8/2018 | Khirallah | H04L 1/1812 |
| 2018/0254794 | A1* | 9/2018 | Lee | H04L 5/0053 |
| 2018/0255586 | A1* | 9/2018 | Einhaus | H04W 72/0413 |
| 2018/0270834 | A1* | 9/2018 | Falconetti | H04W 72/082 |
| 2018/0279376 | A1* | 9/2018 | Dinan | H04W 74/0833 |
| 2018/0302927 | A1* | 10/2018 | Noh | H04W 74/0816 |
| 2018/0324716 | A1* | 11/2018 | Jeon | H04W 74/0833 |
| 2018/0324853 | A1* | 11/2018 | Jeon | H04W 74/006 |

(56) References Cited

U.S. PATENT DOCUMENTS

| | | | |
|---|---|---|---|
| 2018/0332478 A1* | 11/2018 | Noh | H04L 5/0051 |
| 2018/0338335 A1* | 11/2018 | Mukherjee | H04L 27/0006 |
| 2019/0007181 A1* | 1/2019 | Marinier | H04L 5/0007 |
| 2019/0014548 A1* | 1/2019 | Pelletier | H04W 56/001 |
| 2019/0029040 A1* | 1/2019 | Sun | H04W 74/085 |
| 2019/0037608 A1* | 1/2019 | Harada | H04W 74/0833 |
| 2019/0044639 A1* | 2/2019 | Ouchi | H04L 5/001 |
| 2019/0053242 A1* | 2/2019 | Akula | H04W 72/0413 |
| 2019/0053255 A1* | 2/2019 | Li | H04L 5/0064 |
| 2019/0053313 A1* | 2/2019 | Zhou | H04W 52/146 |
| 2019/0075001 A1* | 3/2019 | Stern-Berkowitz | H04W 16/14 |
| 2019/0075581 A1* | 3/2019 | Salem | H04W 72/1289 |
| 2019/0081753 A1* | 3/2019 | Jung | H04B 7/063 |
| 2019/0089498 A1* | 3/2019 | Pelletier | H04L 5/0053 |
| 2019/0090273 A1* | 3/2019 | Yoo | H01Q 1/246 |
| 2019/0098658 A1* | 3/2019 | Noh | H04L 5/0055 |
| 2019/0104416 A1* | 4/2019 | Yerramalli | H04W 72/048 |
| 2019/0104548 A1* | 4/2019 | Fan | H04W 74/0891 |
| 2019/0116615 A1* | 4/2019 | Harada | H04W 72/0446 |
| 2019/0124606 A1* | 4/2019 | Dinan | H04W 52/365 |
| 2019/0132834 A1* | 5/2019 | Yan | H04W 52/146 |
| 2019/0132862 A1* | 5/2019 | Jeon | H04L 5/0064 |
| 2019/0132882 A1* | 5/2019 | Li | H04W 74/0833 |
| 2019/0140812 A1* | 5/2019 | Abedini | H04B 7/0404 |
| 2019/0141713 A1* | 5/2019 | Cimpu | H04W 16/02 |
| 2019/0149365 A1* | 5/2019 | Chatterjee | H04L 5/0092 370/329 |
| 2019/0150088 A1* | 5/2019 | Sun | H04W 52/0216 455/574 |
| 2019/0150176 A1* | 5/2019 | Pelletier | H04L 1/1812 370/329 |
| 2019/0159135 A1* | 5/2019 | MolavianJazi | H04W 52/146 |
| 2019/0159136 A1* | 5/2019 | MolavianJazi | H04W 72/1284 |
| 2019/0159187 A1* | 5/2019 | Dinan | H04W 74/0808 |
| 2019/0159258 A1* | 5/2019 | Islam | H04L 5/0053 |
| 2019/0166645 A1* | 5/2019 | Sadiq | H04B 17/17 |
| 2019/0174449 A1* | 6/2019 | Shan | H04W 60/00 |
| 2019/0174466 A1* | 6/2019 | Zhang | H04L 5/005 |
| 2019/0174472 A1* | 6/2019 | Lee | H04W 72/042 |
| 2019/0174554 A1* | 6/2019 | Deenoo | H04W 16/14 |
| 2019/0199571 A1* | 6/2019 | Wilson | H04L 27/2657 |
| 2019/0200209 A1* | 6/2019 | Velev | H04W 48/18 |
| 2019/0200285 A1* | 6/2019 | Velev | H04W 8/02 |
| 2019/0207723 A1* | 7/2019 | Lei | H04L 5/0094 |
| 2019/0208478 A1* | 7/2019 | Park | H04W 24/10 |
| 2019/0208482 A1* | 7/2019 | Tooher | H04L 5/0094 |
| 2019/0215220 A1* | 7/2019 | Islam | H04B 7/088 |
| 2019/0222400 A1* | 7/2019 | Bagheri | H04L 1/0013 |
| 2019/0229967 A1* | 7/2019 | Frank | H04L 27/2605 |
| 2019/0230597 A1* | 7/2019 | Akkarakaran | H04W 52/367 |
| 2019/0245726 A1* | 8/2019 | Boudreau | H04L 27/2602 |
| 2019/0246430 A1* | 8/2019 | Baghel | H04W 72/0446 |
| 2019/0253210 A1* | 8/2019 | Boudreau | H04L 5/0044 |
| 2019/0268940 A1* | 8/2019 | Yerramalli | H04W 74/0808 |
| 2019/0274054 A1* | 9/2019 | Salem | H04L 12/189 |
| 2019/0313464 A1* | 10/2019 | Einhaus | H04W 72/02 |
| 2019/0320467 A1* | 10/2019 | Freda | H04W 74/0833 |
| 2019/0342851 A1* | 11/2019 | Shan | H04W 60/00 |
| 2019/0349969 A1* | 11/2019 | Chakraborty | H04W 72/1273 |
| 2019/0373645 A1* | 12/2019 | Babaei | H04W 24/08 |
| 2020/0008108 A1* | 1/2020 | Yoo | H04W 16/14 |
| 2020/0163023 A1 | 5/2020 | Pelletier et al. | |

OTHER PUBLICATIONS

"3rd Generation Partnership Project; Technical Specification Group Radio Access Network; Evolved Universal Terrestrial Radio Access (E-UTRA); Physical layer procedures (Release 14)", 3GPP TS 36.213 V14.2.0, Mar. 2017, 454 pages.

"3rd Generation Partnership Project; Technical Specification Group Radio Access Network; Evolved Universal Terrestrial Radio Access (E-UTRA); User Equipment (UE) radio transmission and reception (Release 14)", 3GPP TS 36.101 V14.3.0, Mar. 2017, 1369 pages.

"3rd Generation Partnership Project; Technical Specification Group Services and System Aspects; Procedures for the 5G System; Stage 2 (Release 15)", 3GPP TS 23.502 V0.4.0, May 2017, 126 pages.

"3rd Generation Partnership Project; Technical Specification Group Services and System Aspects; Study on the security aspects of the next generation system (Release 14)", 3GPP TR 33.899 V1.2.0, Jun. 2017, 586 pages.

"3rd Generation Partnership Project; Technical Specification Group Services and System Aspects; System Architecture for the 5G System; Stage 2 (Release 15)", 3GPP TS 23.501 V1.0.0, Jun. 2017, 146 pages.

Nokia, "Agreement related to key issue Key issue #7.8: Privacy protection of network slice identifier", 3GPP TSG SA WG3, 3GPP Tdoc S3-171552; (Security) Meeting #87; Slovenia, Ljubljana, May 15-19, 2017, 1 page.

Shaik, Altaf, et al., "Practical Attacks Against Privacy and Availability in 4G/LTE MobileCommunication Systems", Available at: https://arxiv.org/pdf/1510.07563.pdf, Aug. 7, 2017, 16 pages.

* cited by examiner

METHODS, APPARATUSES AND SYSTEMS FOR ADAPTIVE UPLINK POWER CONTROL IN A WIRELESS NETWORK

RELATED APPLICATIONS

This application claims the benefit of U.S. Provisional Patent Application No. 62/630,222 filed Feb. 13, 2018, which is incorporated by reference herein. This application is related to International Application No. PCT/US2018/37000 filed Jun. 12, 2018, which is incorporated by reference herein.

BACKGROUND

Mobile communications are in continuous evolution and are already at doorsteps of its fifth incarnation, which is called, $5^{th}$ Generation ("5G"). As with previous generations, new use cases have been proposed in connection with setting of requirements for the new system.

Such 5G system may correspond at least in part to a New Radio access technology ("NR") that meets 5G requirements. The NR access technology may be expected to support a number of use cases such as enhanced Mobile Broadband (eMBB), ultra-high reliability and low latency communications (URLLC), and massive machine type communications (mMTC). Each use case comes with its own set of requirements of spectral efficiency, low latency and massive connectivity, for example. The NR access technology may be also expected to have an uplink power control mechanism for power allocation.

SUMMARY

Methods, apparatuses, and systems directed to adaptive uplink power control in a wireless network are provided. The methods, apparatuses, and systems may include sharing a wireless transmit/receive unit's (e.g., a user equipment's) total available power for uplink transmissions. In various embodiments, the total available power for uplink transmissions may overlap at least partly in time, for example when scheduling information for at least one transmission may not yet be available (e.g., due to significant differences in timeline and/or due to uncoordinated (e.g., multi-node) scheduling, etc.).

Among the methods is a method, implemented in a wireless transmit/receive unit (WTRU), directed to power allocation. The method may include any of identifying, from a plurality of transmissions, a first group of transmissions for transmission by the WTRU during a first transmission opportunity on a first uplink; determining a first power level for the first group of transmissions based, at least in part, on one or more first characteristics of the first transmission opportunity and one or more second characteristics of a second transmission opportunity on a second uplink, wherein the second transmission opportunity is usable by the WTRU for transmission of a second group of the plurality of transmissions; and transmitting the first group of transmissions at least at the first power level during a first transmission opportunity.

In an embodiment, the first and second characteristics may define first and second time resources of the first and second transmission opportunities, respectfully. In an embodiment, at least some of the first and second time resources may overlap.

In an embodiment, the first and second time resources may define respective start times and durations. In an embodiment, the one or more first characteristics and the one or more second characteristics may include respective channel access methods. In an embodiment, at least the first channel access method may define a listen-before-talk (LBT) mechanism.

In an embodiment, the one or more first characteristics and the one or more second characteristics may comprise respective channel access methods. In an embodiment, the first channel access method may define a listen-before-talk (LBT) mechanism. In an embodiment, the second channel access method might not (e.g., does not) define a LBT mechanism.

In an embodiment, the first uplink may include one or more physical resources of unlicensed spectrum. In an embodiment, the second uplink may include one or more physical resources of licensed spectrum.

In an embodiment, the method may include determining a second power level for the second group of transmission based, at least in part, on excluding a portion of available power reserved for the first transmission opportunity.

In an embodiment, the method may include any of determining a likelihood of transmitting any of the first group of transmissions during the first transmission opportunity based on scheduling information; and on condition that the likelihood is zero or satisfies (e.g., is less than or equal to) a configured threshold, reserving a portion of available power for the first transmission opportunity; and determining a second power level for the second group of transmission based, at least in part, on excluding the portion of available power reserved for the first transmission opportunity.

In an embodiment, the method may include any of determining whether the second power level exceeds a second guaranteed power level associated with the second group of transmissions; and on condition that the second power level exceeds the second guaranteed power level, adjusting any of the first guaranteed power level, a second guaranteed power level associated with the second group of transmissions, and a remaining power level, wherein the remaining power level corresponds to a difference between a maximum power and the first and second guaranteed power level combined, if any.

In an embodiment, the method may include any of determining whether the first power level exceeds the first guaranteed power level associated with the first group of transmissions; and on condition that the first power level exceeds the first guaranteed power level, adjusting any of the first guaranteed power level, the second guaranteed power, and the remaining power level, if any.

In an embodiment, the method may include any of determining whether the first power level exceeds a first guaranteed power level associated with the first group of transmissions; and on condition that the first power level exceeds the first guaranteed power level, adjusting any of the first guaranteed power level, a second guaranteed power level associated with the second group of transmissions, and a remaining power level, wherein the remaining power level corresponds to a difference between a maximum power and the first and second guaranteed power level combined, if any.

In an embodiment, the one or more first characteristics and the one or more second characteristics may include respective channel access methods. In an embodiment, at least the second channel access method may define a listen-before-talk (LBT) mechanism.

In an embodiment, the one or more first characteristics and the one or more second characteristics may include comprise respective channel access methods. In an embodiment, the first channel access method might not (e.g., does not) define an LBT mechanism, and the second channel access method may define a LBT mechanism.

In an embodiment, the first uplink may include one or more physical resources of licensed spectrum. In an embodiment, the second uplink may include one or more physical resources of unlicensed spectrum.

In an embodiment, wherein determining a first power level may include excluding a portion of available power reserved for the second transmission opportunity.

In an embodiment, the method may include any of determining a likelihood of transmitting any of the second group of transmissions during the second transmission opportunity based on scheduling information; and on condition that the likelihood is zero or satisfies (e.g., is less than or equal to) a configured threshold, reserving a portion of available power for the second transmission opportunity, wherein determining the first power level may include excluding the portion of available power reserved for the second transmission opportunity.

In an embodiment, the method may include any of determining whether the first power level exceeds a first guaranteed power level associated with the first group of transmissions; and on condition that the first power level exceeds the first guaranteed power level, adjusting any of the first guaranteed power level, a second guaranteed power level associated with the second group of transmissions, and a remaining power level, wherein the remaining power level corresponds to a difference between a maximum power and the first and second guaranteed power level combined, if any.

In an embodiment, the method may include any determining a second power level for the second group of transmission based, at least in part, on excluding a portion of available power reserved for the first transmission opportunity.

In an embodiment, the method may include any of determining a likelihood of transmitting any of the first group of transmissions during the first transmission opportunity based on scheduling information; on condition that the likelihood is zero or satisfies (e.g., is less than or equal to) a configured threshold, reserving a portion of available power for the first transmission opportunity; and/or determining a second power level for the second group of transmission based, at least in part, on excluding the portion of available power reserved for the first transmission opportunity.

In an embodiment, the method may include any of determining whether the second power level exceeds a second guaranteed power level associated with the second group of transmissions; and on condition that the second power level exceeds the second guaranteed power level, adjusting any of the first guaranteed power level, a second guaranteed power level associated with the second group of transmissions, and a remaining power level, wherein the remaining power level may correspond to a difference between a maximum power and the first and second guaranteed power level combined, if any.

In an embodiment, the method may include determining whether the first power level exceeds the first guaranteed power level associated with the first group of transmissions; and on condition that the first power level exceeds the first guaranteed power level, adjusting any of the first guaranteed power level, the second guaranteed power, and the remaining power level, if any.

In an embodiment, identifying the first group of transmissions may include identifying transmissions based on the one or more first characteristics and the one or more second characteristics.

Among the apparatuses is a WTRU (and/or elements thereof) configured for power allocation. The elements of the WTRU may include circuitry, including any of a transmitter, receiver, processor and memory. The WTRU may identify, from a plurality of transmissions, a first group of transmissions for transmission by the WTRU during a first transmission opportunity on a first uplink; determine a first power level for the first group of transmissions based, at least in part, on one or more first characteristics of the first transmission opportunity and one or more second characteristics of a second transmission opportunity on a second uplink, wherein the second transmission opportunity is usable by the WTRU for transmission of a second group of the plurality of transmissions; and/or transmit the first group of transmissions at least at the first power level during a first transmission opportunity.

In an embodiment, the first and second characteristics may define first and second time resources of the first and second transmission opportunities, respectfully. In an embodiment, at least some of the first and second time resources may overlap.

In an embodiment, the first and second time resources may define respective start times and durations. In an embodiment, the one or more first characteristics and the one or more second characteristics may include respective channel access methods. In an embodiment, at least the first channel access method may define an LBT mechanism.

In an embodiment, the one or more first characteristics and the one or more second characteristics may comprise respective channel access methods. In an embodiment, the first channel access method may define an LBT mechanism. In an embodiment, the second channel access method might not (e.g., does not) define an LBT mechanism.

In an embodiment, the first uplink may include one or more physical resources of unlicensed spectrum. In an embodiment, the second uplink may include one or more physical resources of licensed spectrum.

In an embodiment, the WTRU may determine a second power level for the second group of transmission based, at least in part, on excluding a portion of available power reserved for the first transmission opportunity.

In an embodiment, the WTRU may determine a likelihood of transmitting any of the first group of transmissions during the first transmission opportunity based on scheduling information; on condition that the likelihood is zero or satisfies (e.g., is less than or equal to) a configured threshold, reserve a portion of available power for the first transmission opportunity; and/or determine a second power level for the second group of transmission based, at least in part, on excluding the portion of available power reserved for the first transmission opportunity.

In an embodiment, the WTRU may determine whether the second power level exceeds a second guaranteed power level associated with the second group of transmissions; and/or on condition that the second power level exceeds the second guaranteed power level, adjust any of the first guaranteed power level, a second guaranteed power level associated with the second group of transmissions, and a remaining power level, wherein the remaining power level may correspond to a difference between a maximum power and the first and second guaranteed power level combined, if any.

In an embodiment, the WTRU may determine whether the first power level exceeds the first guaranteed power level associated with the first group of transmissions; and/or on condition that the first power level exceeds the first guaranteed power level, adjust any of the first guaranteed power level, the second guaranteed power, and the remaining power level, if any.

In an embodiment, the WTRU may determine whether the first power level exceeds a first guaranteed power level associated with the first group of transmissions; and/or on condition that the first power level exceeds the first guaranteed power level, adjust any of the first guaranteed power level, a second guaranteed power level associated with the second group of transmissions, and a remaining power level, wherein the remaining power level may correspond to a difference between a maximum power and the first and second guaranteed power level combined, if any.

In an embodiment, the one or more first characteristics and the one or more second characteristics may include respective channel access methods. In an embodiment, at least the second channel access method may define a LBT mechanism.

In an embodiment, the one or more first characteristics and the one or more second characteristics may include comprise respective channel access methods. In an embodiment, the first channel access method might not (e.g., does not) define a LBT mechanism, and the second channel access method may define a LBT mechanism.

In an embodiment, the first uplink may include one or more physical resources of licensed spectrum. In an embodiment, the second uplink may include one or more physical resources of unlicensed spectrum.

In an embodiment, the WTRU may determine a first power level at least in part by excluding a portion of available power reserved for the second transmission opportunity.

In an embodiment, the WTRU may determine a likelihood of transmitting any of the second group of transmissions during the second transmission opportunity based on scheduling information; and/or on condition that the likelihood is zero or satisfies (e.g., is less than or equal to) a configured threshold, reserve a portion of available power for the second transmission opportunity, wherein the WTRU may determine the first power level at least in part by excluding the portion of available power reserved for the second transmission opportunity.

In an embodiment, the WTRU may determine whether the first power level exceeds a first guaranteed power level associated with the first group of transmissions; and/or on condition that the first power level exceeds the first guaranteed power level, adjust any of the first guaranteed power level, a second guaranteed power level associated with the second group of transmissions, and a remaining power level, wherein the remaining power level may correspond to a difference between a maximum power and the first and second guaranteed power level combined, if any.

In an embodiment, the WTRU may determining a second power level for the second group of transmission based, at least in part, on excluding a portion of available power reserved for the first transmission opportunity.

In an embodiment, the WTRU may determine a likelihood of transmitting any of the first group of transmissions during the first transmission opportunity based on scheduling information; on condition that the likelihood is zero or satisfies (e.g., is less than or equal to) a configured threshold, reserve a portion of available power for the first transmission opportunity; and/or determine a second power level for the second group of transmission based, at least in part, on excluding the portion of available power reserved for the first transmission opportunity.

In an embodiment, the WTRU may determine whether the second power level exceeds a second guaranteed power level associated with the second group of transmissions; and/or on condition that the second power level exceeds the second guaranteed power level, adjusting any of the first guaranteed power level, a second guaranteed power level associated with the second group of transmissions, and a remaining power level, wherein the remaining power level may correspond to a difference between a maximum power and the first and second guaranteed power level combined, if any.

In an embodiment, the WTRU may determine whether the first power level exceeds the first guaranteed power level associated with the first group of transmissions; and/or on condition that the first power level exceeds the first guaranteed power level, adjust any of the first guaranteed power level, the second guaranteed power, and the remaining power level, if any.

In an embodiment, the WTRU may identify the first group of transmissions at least in part by identifying transmissions based on the one or more first characteristics and the one or more second characteristics.

Although various embodiments are described and/or claimed herein in which an apparatus, system, device, etc. and/or any element thereof carries out an operation, process, algorithm, function, etc. and/or any portion thereof, it is be understood that any embodiments described and/or claimed herein assume that any apparatus, system, device, etc. and/or any element thereof is configured to carry out any operation, process, algorithm, function, etc. and/or any portion thereof.

BRIEF DESCRIPTION OF THE DRAWINGS

A more detailed understanding may be had from the detailed description below, given by way of example in conjunction with drawings appended hereto. Figures in the description, are examples. As such, the Figures and the detailed description are not to be considered limiting, and other equally effective examples are possible and likely. Furthermore, like reference numerals in the figures indicate like elements, and wherein.

DETAILED DESCRIPTION

Representative Communication Systems

Figure 1A:
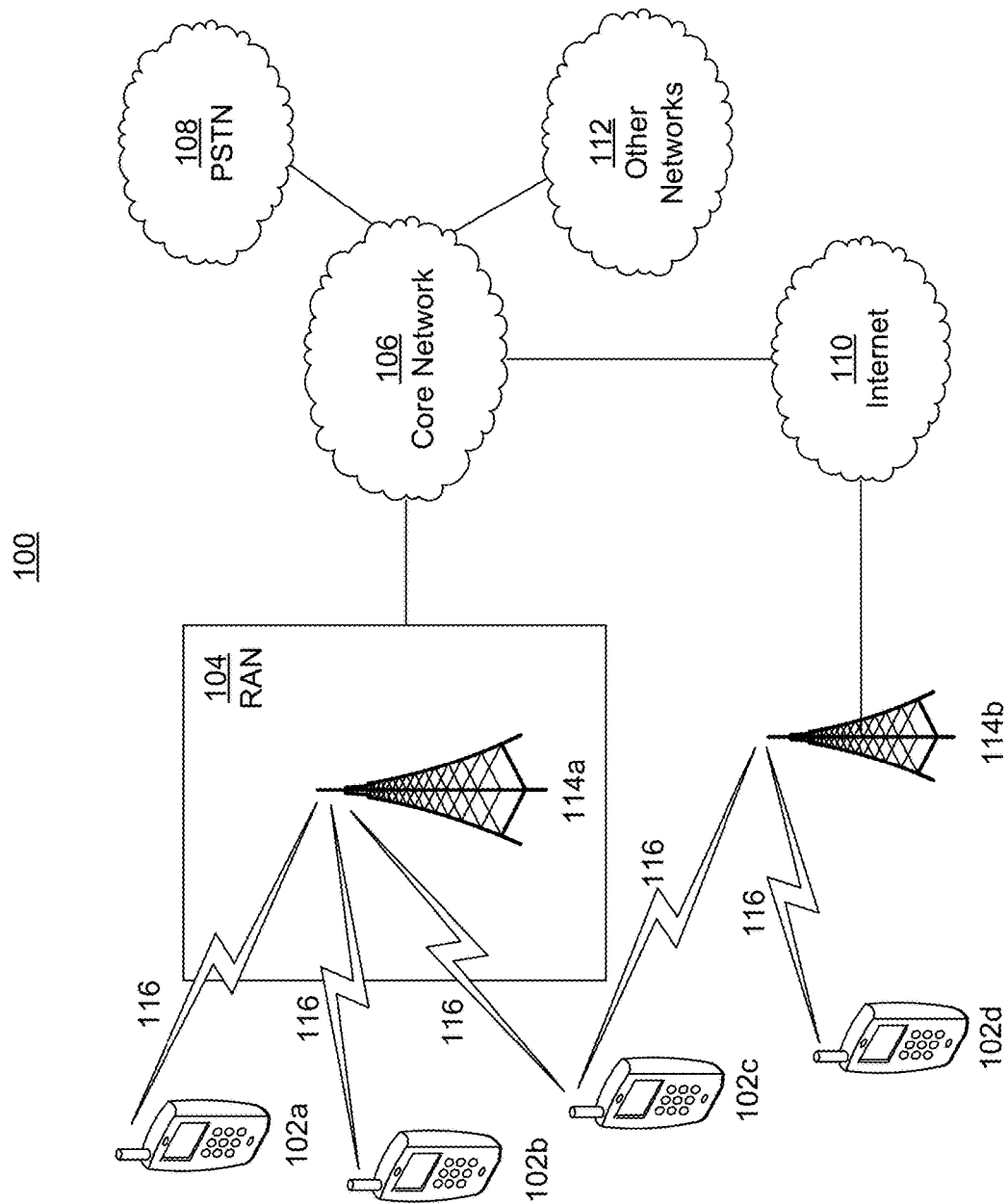
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HIVID), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
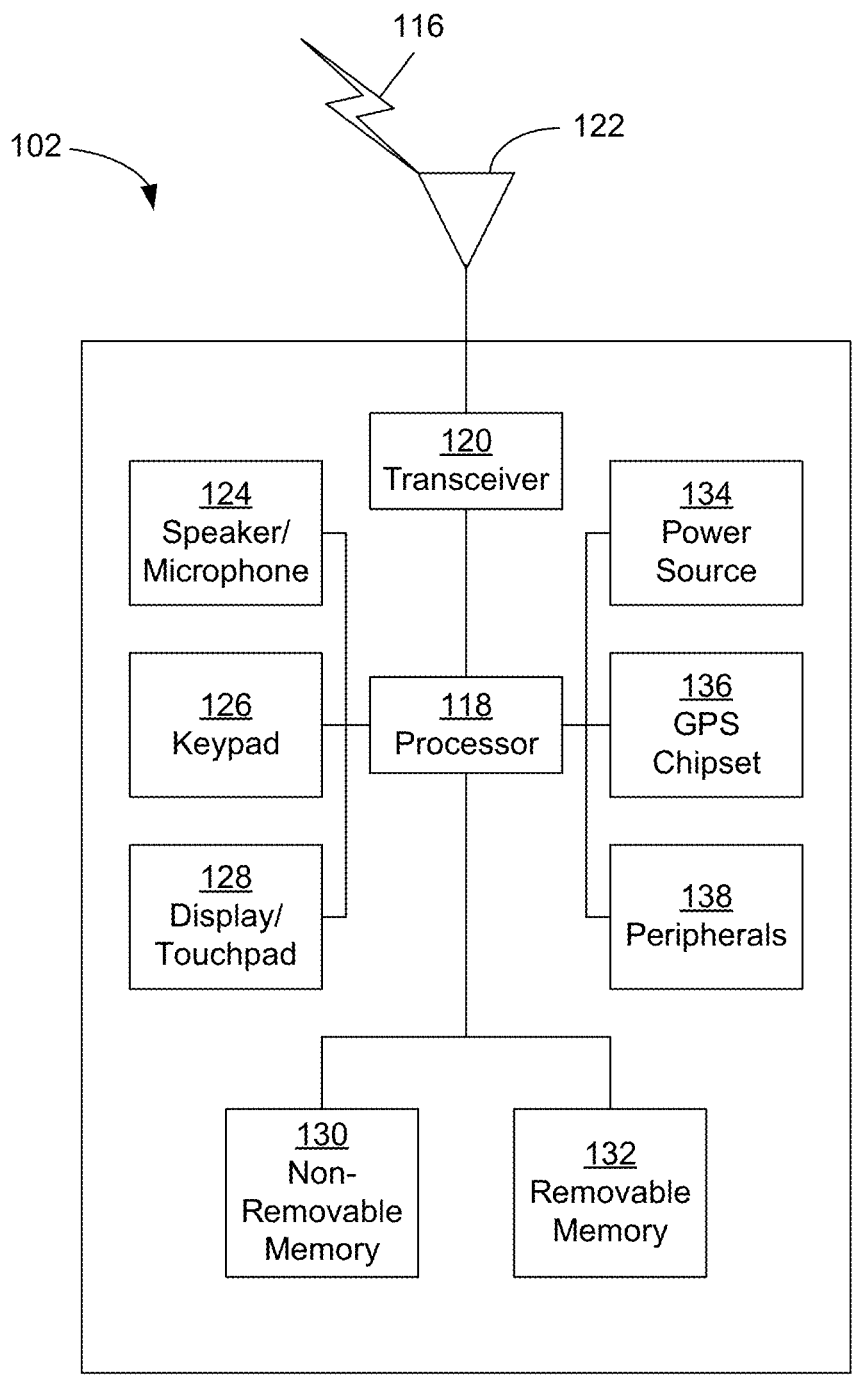
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
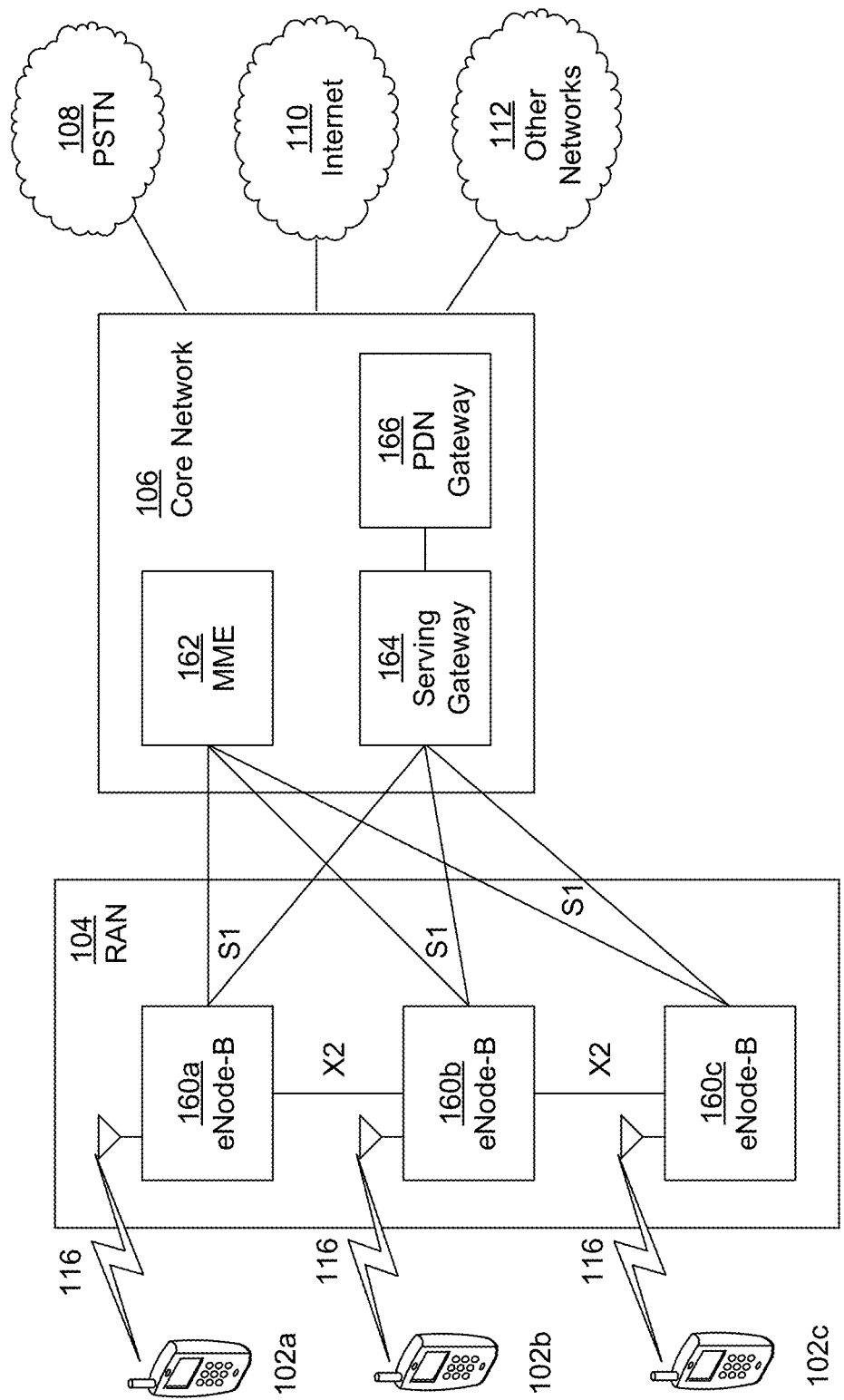
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the Si interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the disclosed operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
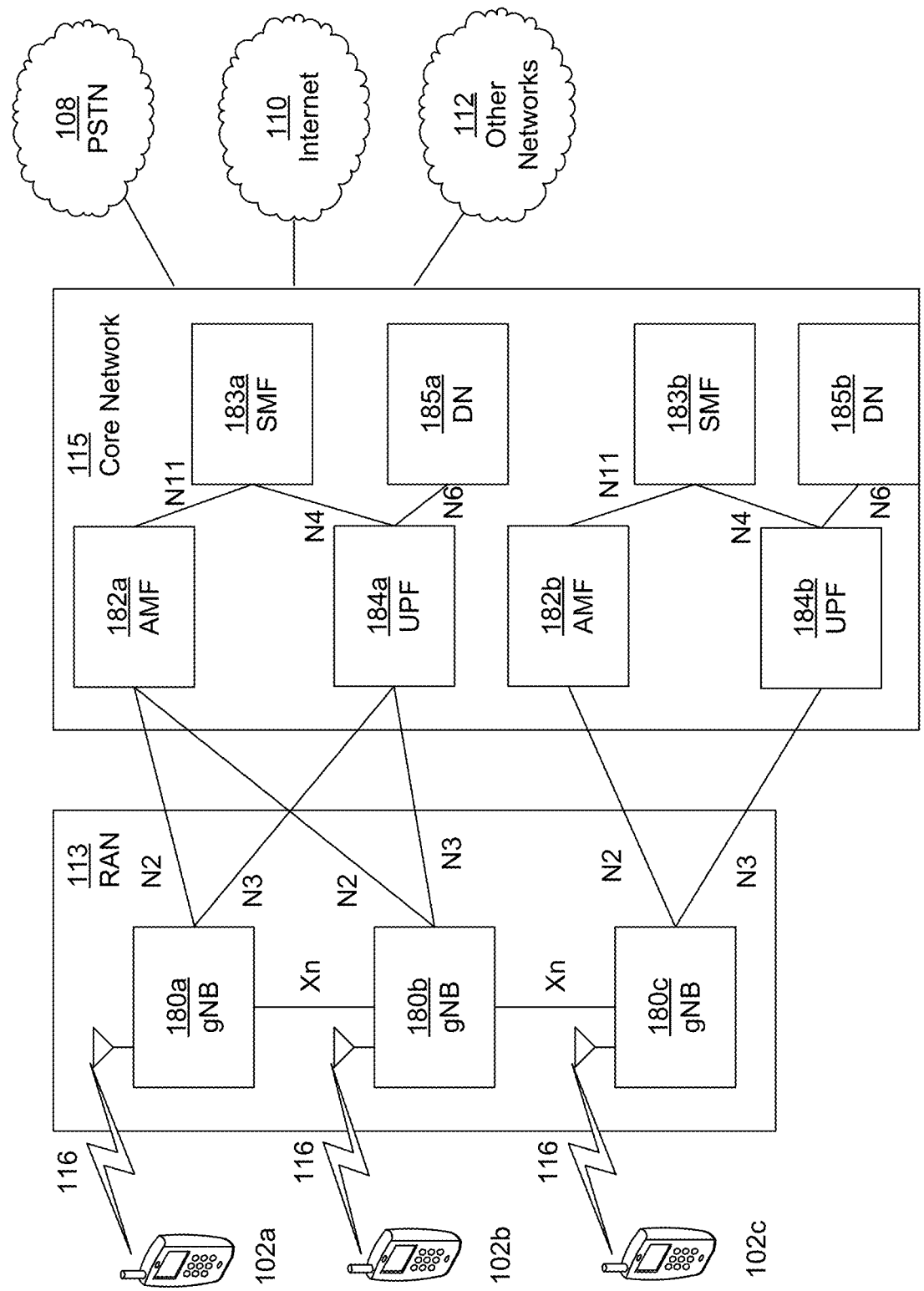
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU (e.g., UE) IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions disclosed herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) disclosed herein, may be performed by one or more emulation devices (not shown). The emulation devices may be one or more devices configured to emulate one or more, or all, of the functions disclosed herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Representative Power Control with Dual Connectivity (DC)

In a wireless network (e.g., LTE), a WTRU may determine transmission power for a type of transmission as a function of desired receive power, Po (e.g., may be signaled within system information for a given cell) that is, for example, the power necessary to compensate for propagation loss, PL (e.g., based on an estimated path loss estimation, etc.). PL is a downlink pathloss estimate calculated by the WTRU in dB and PL=referenceSignalPower−higher layer filtered Reference Signal Received Power (RSRP), where referenceSignalPower is provided by higher layers and RSRP.

This may include a further unit/fractional compensation coefficient ∝ in case of a physical uplink shared channel (PUSCH), an offset amount of power to meet a certain error rate and/or SINR, e.g., Δformat (e.g., for hybrid automatic request (HARD) Acknowledgment/Negative acknowledgement, Service Request (SR), Channel Quality Indicator (CQI) or combination on a physical uplink control channel (PUCCH)) or ΔMCS (Modulation and Coding Scheme, e.g., for the PUSCH), a component as a function of the number "M" of RBs used for the transmission for the PUSCH, and a correction based on reception of transmit power control (TPC) from the network ∂ (typically +/−1 dB, 0 or 3 dB), etc. In various embodiments, the WTRU may include a sum of previous quantities in determining a transmission power.

In certain embodiments, in a wireless network (e.g., LTE) the WTRU may determine transmission power for a PUCCH (e.g., without a PUSCH) according to something similar to the following: $P_{PUCCH}$=fct($P_o$, PL, Δformat, ∂=ΣTPC).

In certain embodiments, in a wireless network (e.g., LTE) the WTRU may determine transmission power for a PUSCH (e.g., without a PUCCH) according to something similar to the following: $P_{PUSCH}$=fct($P_o$, ∝PL, 10 $\log_{10}$(M), ΔMCS, ∂=ΣTPC).

Representative Overview of Power Control Operations for DC

Figure 2:
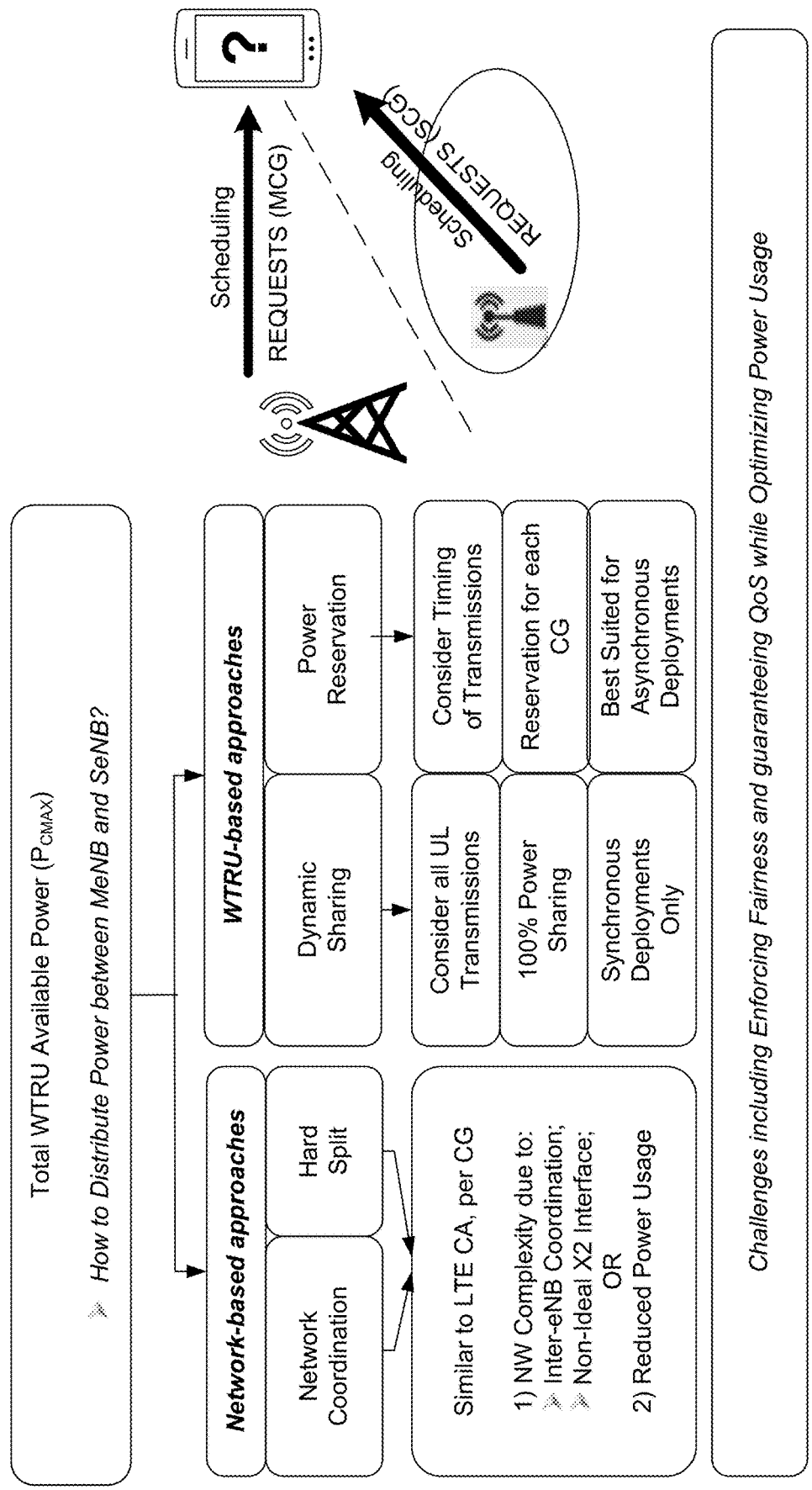
FIG. 2 is a block diagram illustrating representative power allocation based on network-based and WTRU-based approaches.

FIG. 2 is a block diagram illustrating representative power allocation based on network-based and/or WTRU-based approaches. Referring to FIG. 2 to distribute power between a master evolved Node B (MeNB) and a slave evolved Node B (SeNB) for a total available Power for a WTRU, the network-based operation may include any one or more of: a network coordination and a hard split (e.g., allocating fixed power level(s)). The WTRU-based procedure may include any one or more of: dynamic sharing including at least considering/determining uplink (e.g., all uplink) transmissions and/or power reservation. There may be a number of possible procedures to allocate a total WTRU available power (e.g., $P_{CMAX}$) to different transmissions in the presence of independent scheduling instructions.

In various embodiments, two types of power control modes (PCMs) may be defined, mode 1 and mode 2. A WTRU capable of DC may support at least PCM 1 and the WTRU may additionally support PCM 2. In both modes, the WTRU may be configured with a minimum guaranteed power for each cell group (CG), as a ratio of the total available power PCMAX.

Representative PCM 1—Dynamic Sharing Operation

Figure 3:
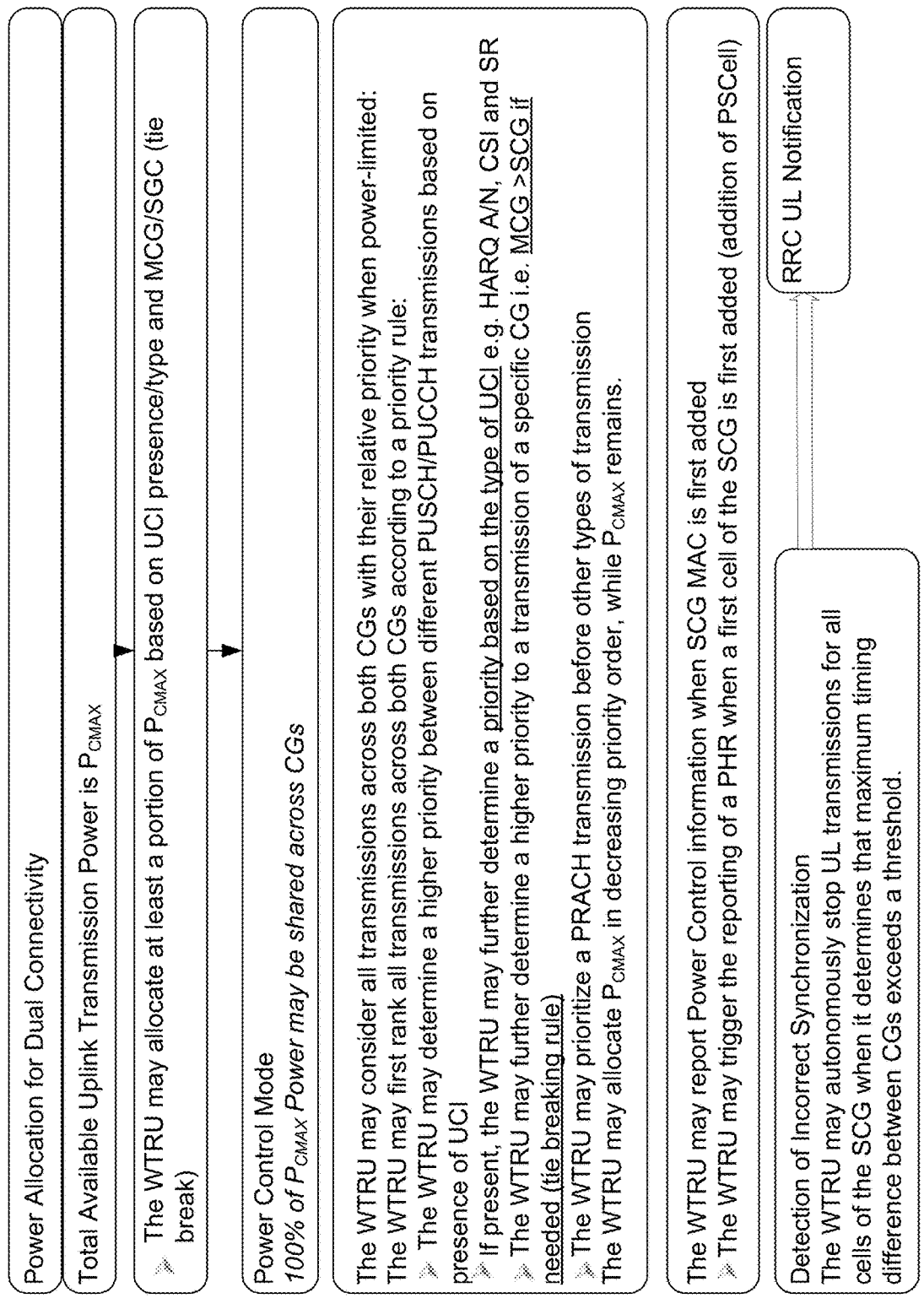
FIG. 3 is a block diagram illustrating an overview of Power Control Mode (PCM) 1 representative dynamic sharing approach.

In various embodiments, in PCM 1, a WTRU may allocate up to a minimum guaranteed power to a CG, (e.g., each CG) and any remaining power may be shared across a Master CG (MCG) and Secondary CG (SCG) on a per transmission basis, for example according to a priority order based on uplink control information (UCI) type, as illustrated in FIG. 3.

FIG. 3 is a block diagram illustrating an overview of a PCM 1 representative dynamic sharing operation. Referring to FIG. 3, the WTRU may consider transmissions (e.g., all transmissions) across both CGs with their relative priority, for example, when power is limited. The WTRU may report power control information, for example, when SCG Medium Access Control (MAC) is first added. The WTRU may autonomously stop uplink transmission for cells, (e.g., all cells) of the SCG when it determines that the maximum timing difference between CGs exceeds a threshold.

Representative PCM 2—Power Reservation Operation

Figure 4:
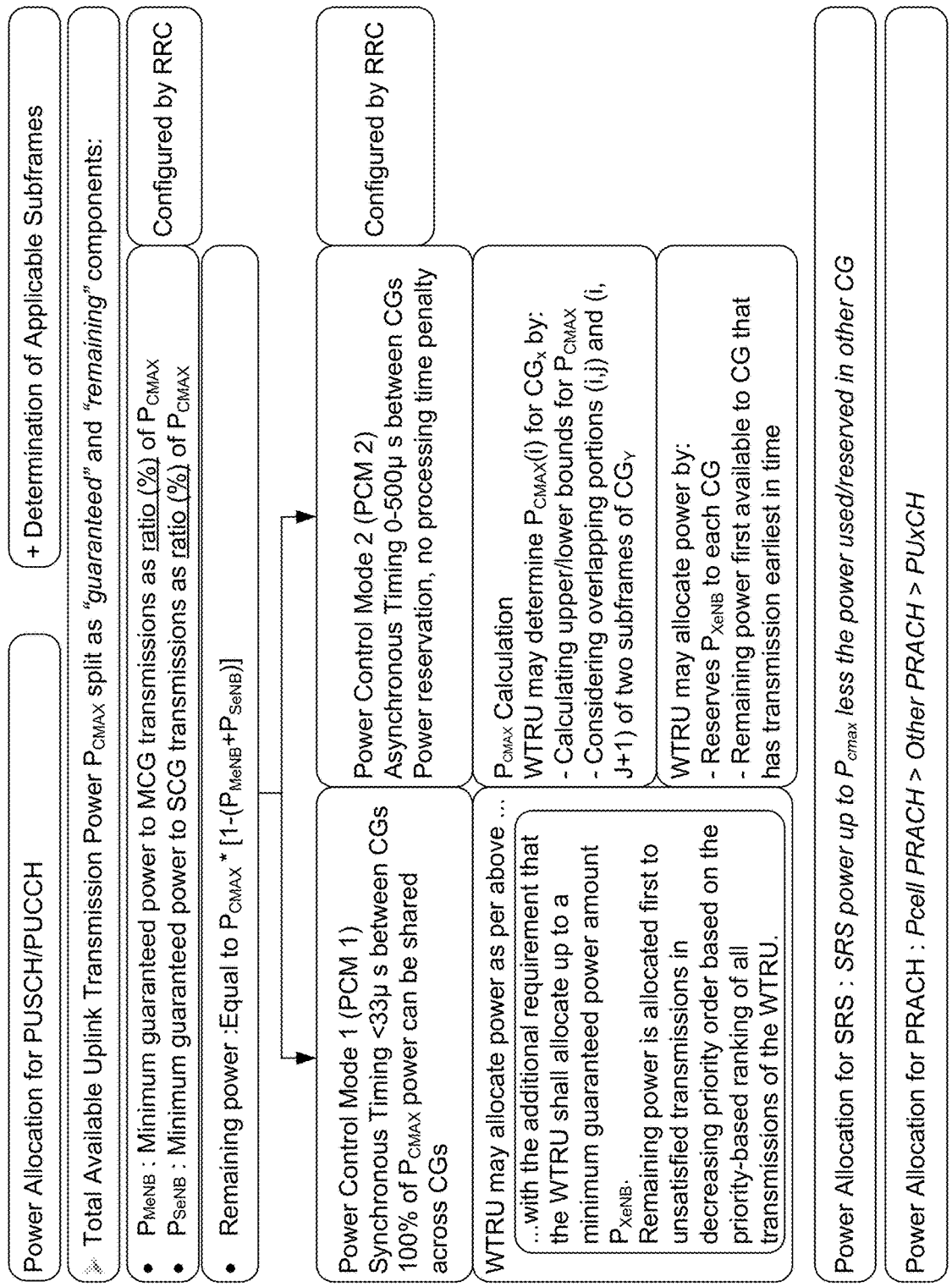
FIG. 4 is a block diagram illustrating an overview of PCM 2 representative power reservation approach in addition to PCM 1 operation and PCM 2 operation.

In various embodiments, in PCM 2, a WTRU may reserve a minimum guaranteed power to a CG (e.g., each CG) (e.g., MCG and/or SCG) and any remaining power may be first made available to the CG that starts the earliest in time, as illustrated in FIG. 4.

FIG. 4 is a block diagram illustrating PCM 2 representative power reservation procedure in addition to the PCM 1 operation and PCM 2 operation. Referring to FIG. 4, a total available uplink transmission power may be split as "guaranteed" and/or "remaining" components. A power level for each of the uplink transmissions (e.g., PUSCH, PUCCH) may be allocated according to a PCM operation. A specific PCM operation may be configured by a network, e.g., via radio resource control (RRC) signaling. The PCM 1 operation may be applicable in a synchronized deployment, e.g., with less than a specific threshold, e.g., 33 μs between CGs.

Differently from the PCM 1 operation, the PCM 2 operation may be applicable in an unsynchronized deployment, e.g., with possibly more than a first specific threshold (e.g., 0 μs) but less than a second specific threshold, e.g., 500 μs between the CGs.

Figure 5:
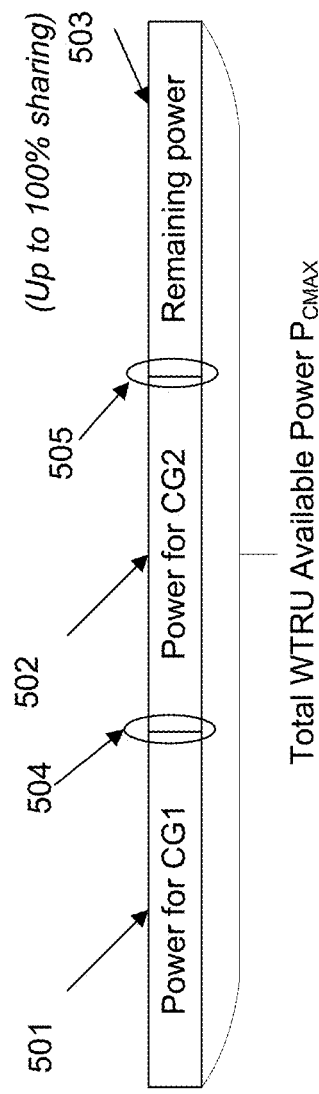
FIG. 5 is a diagram illustrating a representative power allocation for one or more cell groups (CGs)

FIG. 5 is a diagram illustrating a representative power allocation for one or more CGs. Referring to FIG. 5, different portions (e.g., a power portion for CG1 501, a power portion for CG2 502, and a remaining power portion 503) of a total WTRU available power are shown in terms of a minimum guaranteed power for the CGs (e.g., each CG). The minimum guaranteed power for the CGs (e.g., each CG) may be a fraction of the total WTRU available power. The total WTRU available power may be indicated by $P_{CMAX}$ as shown in the FIG. 5. A boundary for each portion is indicated with a circle (e.g., 504 and 505) in FIG. 5. The boundary for each portion (e.g., a minimum guaranteed power for CG1 and a minimum guaranteed power for CG2) may be configured, for example by L3 signaling such as RRC signaling. A value for the boundary for each portion (e.g., 504 and 505) may be semi-statically configured. The sum of the boundary for all CGs (e.g., 504 and 505) may or may not be less than 100% of the total WTRU available power and, if less than 100%, a remaining power portion may be a non-zero value.

Representative NR Access Technology

In various embodiments, the NR access technology may support carrier aggregation (CA) and dual connectivity (DC). In certain embodiments, in the DC configuration, the NR may act as a secondary cell or as an aggregated cell in conjunction with an LTE cell and/or aggregated cells. This scenario may be referred to as non-standalone (NSA) NR operation. The NR may be an anchor in DC and may use some form of standalone operation (SA).

In other embodiments, the NR access technology may support operation with more than one subcarrier spacing value, where the value may be derived from 15 kHz by multiplication and/or division by a power of 2. Such operation may be referred to as "scalable numerology."

In various embodiments, a WTRU supporting NR access technology ("NR WTRU"), may use one "reference numerology" in a given NR carrier, for example, which may define a duration of a subframe for the give NR carrier. For example, the duration of a subframe in NR for a reference numerology with subcarrier spacing $(2^m*15)$ kHz may be exactly $\frac{1}{2}^m$ ms, may be more than $\frac{1}{2}^m$ ms or may be less than $\frac{1}{2}^m$ ms.

In various embodiments, the NR access technology may support multiplexing numerologies in time and/or frequency within a subframe or across subframes from a WTRU perspective.

In various embodiments, a frame structure of NR may be defined as a "slot". A slot may have a duration of a number y of OFDM symbols in a numerology used for one or more transmissions. An integer number of slots may fit within one subframe duration, for example at least when the subcarrier spacing is larger than or equal to that of the reference numerology. In another embodiment, the frame structure of NR may also be defined as a "mini-slot", having a transmission shorter than y OFDM symbols.

Methods, apparatus, and systems for uplink power control in NR may meet the following use cases and be applicable to any other embodiments, use cases and/or wireless technology:

standalone NR with single carrier operation (e.g., with single numerology and/or multiplexed numerology);

NR carrier aggregation multiplexed numerology (e.g., in a same carrier and/or in different carriers). In various embodiments, the NR carrier aggregation multiplexed numerology may be in a same band or different bands, for example, in case of different carriers;

NR in DC with different numerologies; and/or interworking between different radio access technologies (e.g., LTE and NR) with same or different numerologies.

Representative Supplementary Uplink (SUL) Carrier

A WTRU may be configured with a cell with a primary uplink (PUL) carrier and/or a supplementary uplink (SUL) carrier. In a representative embodiment, a cell (e.g., in NR) may be configured with one or more supplementary uplinks. The terms of "PUL" and "SUL" in this disclosure may be used to refer to a primary uplink carrier and supplementary uplink carrier, respectively.

One motivation for the use of SUL may be to extend the coverage of a WTRU operating in different frequencies. For example, the WTRU may be configured to be operating in a high frequency for a first uplink carrier (e.g., a primary uplink (PUL) carrier), such that the WTRU may perform transmissions on the SUL when the SUL is configured as a second uplink carrier to a lower frequency band. This may be useful, e.g., in particular, when the WTRU moves towards the edge of the coverage of the cell's primary uplink carrier. Another possible use of the SUL may be to provide specific services, higher throughput, and/or increased reliability, among others. For example, the WTRU may be configured to perform transmissions on multiple uplinks for multiple cells concurrently (or near concurrently, e.g., in a TDM fashion).

In some representative embodiments, the SUL may be modeled (e.g., in NR) as a cell with a downlink carrier associated with two separate uplink carriers. The uplink carriers may consist of a PUL and a SUL. For example, the PUL may be in a high frequency band where the downlink carrier is also located, and the SUL may be in a lower frequency band.

One or more SULs may be configured for any type of cell, e.g., including (but not limited to) a primary cell (PCell), a secondary cell (SCell), and/or a Secondary PCell (SPCell) for dual connectivity. In a representative embodiment, a SUL may be configured for a WTRU operating using a connection to a single cell and/or when configured for dual connectivity. In another representative embodiment, the SUL may be configured for a WTRU operating in a cell of a multi-RAT dual connectivity system.

The WTRU may perform initial access to a cell using e.g., PUL and/or SUL. The configuration information of the SUL may be broadcast in (e.g., minimum) system information (SI) for a cell. For example, the WTRU may select the SUL for initial access if the downlink quality of the serving cell is below a threshold. The threshold may be pre-configured.

There may be different operating modes for the SUL associated with a WTRU in RRC Connected mode.

In certain representative operation modes, an RRC (e.g., RRC protocol) may configure the WTRU with multiple uplinks. In some representative embodiments, one uplink may be a PUL with a typical uplink configuration for a cell and/or another uplink may minimally include a sounding reference signal (SRS) configuration using, e.g., a SUL. In such a mode of operation, the WTRU may use the PUL for control and data transmission (e.g., all control and data transmission) in the uplink. The WTRU may transmit (e.g., additionally transmit) SRS using resources of the SUL. In some representative embodiments, the RRC reconfiguration may provide an extended, typical, and/or possibly complete, uplink configuration with a different carrier, e.g., to activate and/or to switch the applicable active uplink carrier for the cell for some or all transmissions.

In certain representative operation modes, the RRC (e.g., RRC protocol) may configure multiple uplinks (e.g., with an extended, typical and/or possibly complete uplink configuration). In some representative embodiments, the WTRU may have one or more configurations (e.g., sufficient configuration(s)) to perform some or all types of uplink transmissions (e.g., PUCCH, PUSCH and/or PRACH transmissions) on resources of one or more carriers. In some representative embodiments, the WTRU may receive (e.g., subsequently receive) control signaling (e.g., a MAC Control Element and/or a DCI), e.g., that may activate and/or may initiate a switch between the UL configurations.

In certain representative operation modes, the RRC (e.g., RRC protocol) may configure multiple uplinks where the configuration of two (or more) uplinks may be active either concurrently or in a time-division fashion. In some representative embodiments, this mode of operation may include a restriction such that the WTRU may not perform and/or may not be required to perform some or all types of uplink transmissions, simultaneously. For example, the WTRU may not transmit and/or may not be required to transmit a PUSCH for the cell simultaneously on multiple uplink carriers. In some representative embodiments, the restriction may be configured for the WTRU, e.g., in particular, when the WTRU's capability indicate that the simultaneous transmissions are not supported for, e.g., the configured frequency bands.

In some representative embodiments, for transmissions (e.g., each transmission) a WTRU may perform and/or make, a determination (e.g., decision) of power allocation that may be based on one or more of the following factors:

scheduling information (e.g., downlink control information (DCI) for dynamic scheduling, a configured grant for semi-persistent allocation, and/or information for an unscheduled transmission of one or more transmissions);

path loss measurements and/or estimation (e.g., applicable to resources associated with the one or more transmissions);

available transmission power (e.g., as determined from $P_{CMAX}$); and/or any ongoing and/or scheduled transmission(s) that may overlap at least partly in time with the one or more transmissions.

In various embodiments, the disclosed factors may be related to allocation of transmission power to one or more transmissions performed at a given time.

Representative Unlicensed Spectrum Operation

Unlicensed spectrum may be available for use by a WTRU subject to complying with various requirements, including, for example, requirements for out-of-band emissions, bandwidth and/or transmission power. Some or all of the requirements may be specific (e.g., applicable) to a single or multiple geographical locations (jurisdictions). Some or all of the requirements may be specific (e.g., applicable) to a portion of, a single and/or multiple unlicensed frequency bands.

As an example, the WTRU may be configured to, and may, operate (e.g., receive and/or transmit) over one or more of the unlicensed frequency bands subject to complying with requirements based on any of a mean effective isotropic radiated power (EIRP) and a mean EIRP density at the highest power level. Alternatively, and/or additionally, the WTRU may be configured to, and may, operate over one or more of the unlicensed frequency bands subject to complying with requirements for any of a nominal channel bandwidth (NCB) and an occupied channel bandwidth (OCB). The NCB and/or OCB may be defined for unlicensed spectrum in the 5 GHz region, for example. Alternatively, the NCB and/or OCB may be defined for unlicensed spectrum other than and/or in addition to the 5 GHz region.

In an embodiment, the NCB may be the widest band of frequencies inclusive of guard bands assigned to a single channel. The NCB may be at least 5 MHz for the 5 GHz region, for instance. The OCB may be the bandwidth containing 99% of the power of a signal, and may be between 80% and 100% of a declared NCB. Notwithstanding the above illustrative examples, a device may operate (e.g., temporarily) in a mode where the OCB may be 40% of an NCB of 4 MHz. This mode may be available during an established communication and/or for an NCB that is a minimum of 4 MHz, for example. The mode may be available under other conditions as well.

The WTRU may be configured to, and may, comply with the requirements in various ways. The WTRU, for example, may be configured to, and may, adapt its controls for any of transmission power, RF output power and power density. The adaptation may be carried out in accordance with the adaptation procedures disclosed herein supra and infra.

The adaptation may take into account characteristics of channel access used for an unlicensed frequency band. These characteristics may define that a Listen-Before-Talk (LBT) mechanism is used for channel access. The LBT mechanism may be mandated regardless of the channel being unoccupied. The LBT mechanism may be characterized by various parameters. The parameters may be different for different systems. As an example, for frame-based systems, the LBT mechanism may be characterized by any of a clear channel assessment (CCA) time (e.g., ~20 μs), a channel occupancy time (e.g., minimum 1 ms, maximum 10 ms), an idle period (e.g., minimum 5% of channel occupancy time), a fixed frame period (e.g., equal to the channel occupancy time+idle period), a short control signaling transmission time (e.g., maximum duty cycle of 5% within an observation period of 50 ms), and a CAA energy detection threshold. As another example, for load-based systems (e.g., transmit/receive structure may not be fixed in time), the LBT mechanism may be characterized by a number, N, corresponding to a number of clear idle slots in extended CCA (e.g., instead of the fixed frame period). N may be selected randomly within a range.

As a further example, for LTE, the following functionalities were considered for a Licensed-Assisted Access (LAA) system:

—A LBT Procedure—

The LBT procedure is defined as a mechanism by which an equipment applies a CCA check before using the channel. The CCA utilizes at least energy detection to determine the presence or absence of other signals on a channel in order to determine if a channel is occupied or clear, respectively. European and Japanese regulations mandate the usage of LBT in the unlicensed bands. Apart from regulatory requirements, carrier sensing via LBT is one way for fair sharing of the unlicensed spectrum and hence it is considered to be a vital feature for fair and friendly operation in the unlicensed spectrum in a single global solution framework.

—Discontinuous Transmission on a Carrier with Limited Maximum Transmission Duration—

In unlicensed spectrum, channel availability cannot always be guaranteed. In addition, certain regions such as Europe and Japan prohibit continuous transmission and impose limits on the maximum duration of a transmission burst in the unlicensed spectrum. Hence, discontinuous transmission with limited maximum transmission duration is required functionality for LAA.

—Carrier Selection—

As there is a large available bandwidth of unlicensed spectrum, carrier selection is required for LAA nodes to select the carriers with low interference and that achieve good co-existence with other unlicensed spectrum deployments.

—Transmit Power Control—

Transmit power control is a regulatory requirement in some regions by which a transmitting device should be able to reduce the transmit power in a proportion of 3 dB or 6 dB compared to the maximum nominal transmit power.

—RRM Measurements Including Cell Identification—

Radio resource management (RRM) measurements including cell identification enable mobility between SCells and robust operation in the unlicensed band.

—Channel-State Information (CSI) Measurement, Including Channel and Interference—

A WTRU operating in an unlicensed carrier may support necessary frequency/time estimation and synchronization to enable RRM measurements and for successful reception of information on the unlicensed band.

Representative Challenges Related to Uplink Power Control

Challenge 1: Transmissions may overlap in time and a fraction of an available power may be determined.

Transmissions may be performed such that they may at least partly overlap in time. In such a case, a WTRU may allocate a portion of a total WTRU available power to the transmissions. In certain embodiments, such total WTRU available power may correspond to a PCMAX value. For example, such total WTRU available power may correspond to a $P_{CMAX}$ value less (e.g., minus) a power level already assigned to other, e.g., possibly ongoing, transmissions. For example, the $P_{CMAX}$ value may be calculated as a function of an applicable waveform, numerology and/or frequency band associated with the transmission. For example, the PCMAX value may be calculated as a function of regulatory requirements related to out-of-band emission, SAR, applying (P-) MPR, beam quality or the like.

Challenge 2: Transmissions may have different transmission characteristics, e.g., duration and/or reliability requirements. Transmission characteristics may be significantly different.

Transmissions may be associated with different characteristics. For example, the characteristics may include any of a duration of transmission; a specific timeline, e.g., a HARQ timeline; a type of physical channel; a set of physical resources; a type of HARQ processing; a priority, (e.g., relative to other transmissions); a specific power requirement (e.g., power boosting and/or TPC indication for reliability); a transmission reliability target; an indication and/or an association with a specific type of data and/or logical channel/bearer; and/or a configuration thereof among others. The one or more characteristics may be referred to as a profile of the transmission, e.g., a transmission profile.

Challenge 3: Transmissions may have different scheduling characteristics, e.g., CORESET, BandWidth Part (BWP), uncoordinated schedulers, timelines, etc. Scheduling characteristics may be significantly different.

Such transmissions may be associated with different scheduling characteristics. In certain embodiments, the characteristics may include a set of physical control channel resources (e.g., CORESET(s)) for DCI that schedules the transmission (if applicable), the timing between the reception of the DCI and the start of the transmission, the timing between the transmission of a transport block and the transmission of the transport block associated feedback (e.g., this timing being referred to as K2), the set of physical resources associated with scheduling (e.g., the CG associated with the DCI in case of dual connectivity), a BWP or the like. Such characteristics may be included in the characterization of the transmission profile. In various embodiments, a BWP may correspond to a set of contiguous physical resource blocks (PRBs) that may be characterized by a specific numerology, a specific bandwidth (e.g., number of PRBs) and a specific frequency location (e.g., center frequency). The WTRU may be configured with one or more BWPs for a given carrier and/or cell.

Figure 6:
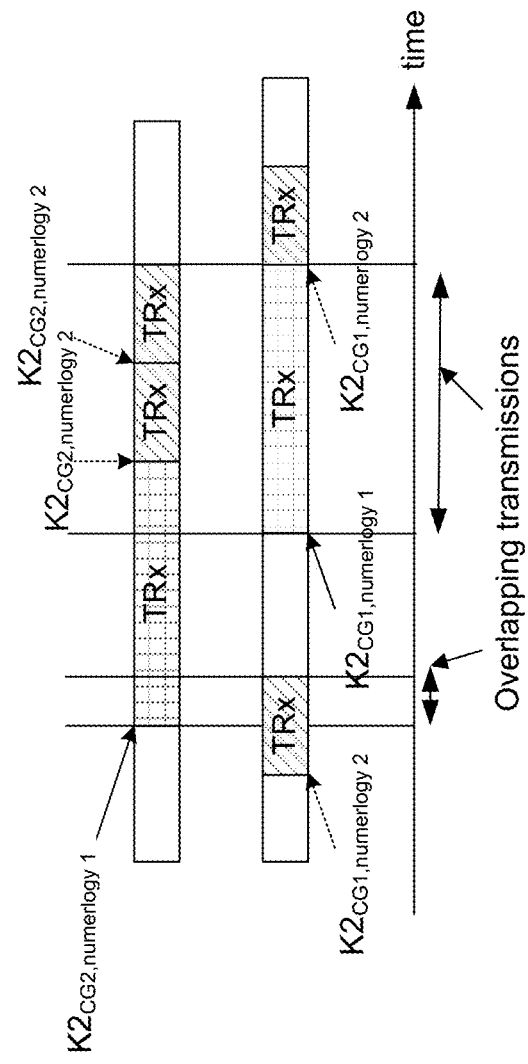
FIG. 6 is a diagram illustrating representative partially overlapping transmission for a plurality of CGs on a timeline.

FIG. 6 is a diagram illustrating representative partially overlapping transmission for a plurality of CGs on a timeline. Referring to FIG. 6, different groups of transmissions that at least partially overlap in time are shown. For example, $K2_{CG2, numerology\ 1}$ may indicate a first transmission duration (e.g., a TTI) for transmission of CG2. $K2_{CG2, numerology\ 2}$ may indicate a second transmission duration (e.g., a TTI) for transmission of CG2. $K2_{CG1, numerology\ 1}$ may indicate the first transmission duration (e.g., a TTI) for transmission of CG1. $K2_{CG1, numerology\ 2}$ may indicate the second transmission duration (e.g., a TTI) for transmission of CG1. The first transmission duration (e.g., a TTI) may be different from the second transmission duration (e.g., a TTI). Different transmissions may have different timelines in terms of, e.g. transmission duration and/or HARQ round trip time (RTT). A respective timeline may be expressed in terms of one or multiple mini-slots, slots or subframes as well as in terms of K2. In some representative embodiments, K2 may correspond to a time between a reception of scheduling information (e.g., DCI) and a start of a transmission of a transport block. K2 may correspond to a time between such transmission of a transport block and the transmission of its associated feedback. K2 may correspond to a time duration (e.g., TTI) that may be applicable to the transmission. The different timelines may be considered as a general case of asynchronous deployment. The different timelines may be impacted by different reception timing for grants of the transmissions and/or by processing times (e.g., insufficient processing times, for example for shorter transmission durations).

Challenge 4: Transmissions may be associated with different network nodes and/or RATs.

The transmissions may be scheduled by a single network node, e.g., such that transmissions requirements for a given WTRU may be coordinated by a single scheduler. One challenge may be related to power control and may happen when the transmissions are scheduled by different network nodes such that coordination may not be possible in terms of power control. In various embodiments, a WTRU may be configured with dual connectivity (e.g., with more than one cell group). For example, a WTRU may support LTE Dual Connectivity, NR Multi-Connectivity, and/or LTE with NR tight interworking.

The above-described challenges may be addressed separately or in combination. In certain embodiments, LTE or another technology may support PCM 1 and PCM 2 for uplink power control for dual connectivity. A network may control a WTRU for power allocation by configuring which power control mode, PCM 1 or PCM 2, is to be used on the WTRU.

In various embodiments, PCM 1 may define relative priorities, for example based on a type of transmission (e.g., priority rank of transmission channels: physical random access channel (PRACH)>PUCCH>PUSCH) and/or based on a type of cell group in case of transmissions of the same type (e.g., Master CG>Secondary CG) for transmissions that start within a threshold (e.g., less than 33 µsec) from each other. PCM 1 may enable sharing of up to 100% of the total WTRU available power (e.g., $P_{CMAX}$).

In various embodiments, PCM 2 may define guaranteed power for transmission associated with each configured CGs, for example, as a fraction of the total WTRU available power (e.g., $P_{CMAX}$). Any remaining power may be assigned to transmissions of the CG whose transmissions start first in time. PCM 2 may enable guarantees of a share of the total WTRU available power at the expense of leaving some power that would have otherwise been useful unused in some cases.

Representative New Challenges for Uplink Power Control on NR

The above described four challenges may be addressed in combination with each other in NR (e.g., and possibly for LTE as well). In various embodiments, support for different transmission time interval (TTI) durations (both in LTE and NR, and combinations thereof), different and possibly varying HARQ timelines and/or different numerologies (LTE with NR and stand-alone NR) and support for different data services (e.g., URLLC, and/or eMBB, etc.) possibly enabling different transmission profiles at physical layer (PHY) processing in combination for a given WTRU possibly further configured with carrier aggregation and/or dual connectivity may lead to an even more complex challenge from a perspective of efficiently using the total WTRU available power. Possible impact from using beamforming, if applicable, may be added to this list of complications.

In various embodiments, shorter transmission duration and scheduling/HARQ timelines may make it impractical (e.g., impractical to implement and process scheduling information in time to perform a transmission), and/or may lead to prohibitive implementation costs.

In other embodiments, varying in timelines and/or TTI durations may modify an amount of overlap between transmissions and make the guarantees and/or priorities more difficult to apply in time.

Operation in in licensed bands under any of E-UTRAN-NR-DC (EN-DC), NR CA and NR DC may introduce different timing relationships among various transmissions of a WTRU (and possibly when being power-limited) in terms of numerology, transmission start time and transmission duration. For example, all configured CCs/uplinks for the WTRU may have the same or different numerology, and overlapping transmissions between different CCs/uplinks may have (i) the same or different starting time; and/or (ii) the same or different PUSCH/PUCCH transmission duration.

The different timing relationships among various transmissions may correspond to (e.g., be modelled as) a general case of possible asynchronicity and arbitrary cases of partial and/or complete overlapping between different uplink transmissions of the same WTRU. The general case may be also due to a possibility of different transmissions operating with different HARQ timelines possibly as a function of dynamic scheduling information. In an embodiment, such scheduling information may include any of dynamically variable (i.e., informed by DCI) scheduling-related delay components, including K1: delay between DL data (PDSCH) reception and corresponding ACK transmission on UL, K2: delay between UL grant reception in DL and UL data (PUSCH) transmission, NI: the number of OFDM symbols required for WTRU processing from the end of NR-PDSCH reception to the earliest possible start of the corresponding ACK/NACK transmission from WTRU perspective and N2: the number of OFDM symbols required for WTRU processing from the end of NR-PDCCH containing the UL grant reception to the earliest possible start of the corresponding NR-PUSCH transmission from WTRU perspective.

In certain embodiments, efficient power sharing may be implemented to allow a WTRU to use as close as possible to (e.g., up to) 100% of the total WTRU available power at any given time and ensure that the system can perform well for offered procedures services.

Representative New Challenges Related to Unlicensed Operation for Uplink Power Control Deployment scenarios in unlicensed bands may include different standalone NR-based operation, different variants of dual connectivity operation e.g., EN-DC with at least one carrier operating according to the LTE radio access technology (RAT) or NR DC with at least two set of one or more carriers operating according to the NR RAT, and/or different variants of carrier aggregation (CA) e.g., possibly also including different combinations of zero or more carriers of each of LTE and NR RATs.

Unlicensed operation may introduce uncertainties in addition to the challenges disclosed herein. Such uncertainties may include uncertainties in terms of (i) whether a WTRU may access a channel in the unlicensed band, and (ii) timing variations due to LBT.

Representative Adaptive Power Allocation Procedures

In various embodiments, the representative adaptive power allocation may be applicable and may be used independently or in combination. The adaptive power allocation procedures may be also applicable to and/or used in combination with other existing power allocation procedures (e.g., LTE PCM 1 and/or PCM 2).

A) Representative Configuration Aspects

For example, a WTRU may be configured (e.g., via RRC or other signaling) with one or more of the following power control algorithms, which may have different applicability in terms of deployment scenarios:

PCM 1 (Power Sharing, Synchronous Operation):

This PCM 1 (or a variant thereof, possibly including operation disclosed herein) may be useful for a WTRU configured for LTE Dual Connectivity, for NR Dual/Multi Connectivity, for LTE and NR tight interworking where cases may be characterized such that transmissions (e.g., all transmissions) have a similar numerology and/or transmission (e.g., TTI) duration. In various embodiments, this PCM 1 may be applicable in a synchronized deployment, e.g., with less than a specific threshold, e.g., 33 µs between the start of overlapping transmissions.

PCM 2 (Power Reservation, Asynchronous Operation):

PCM 2 (or a variant thereof, possibly including operations disclosed herein) may be useful for a WTRU configured for LTE Dual Connectivity, for NR Dual/Multi Connectivity, for LTE and NR tight interworking where in at least cases that may be characterized such that transmissions (e.g., all transmissions) may have a similar numerology and/or transmission (e.g., TTI) duration. This PCM 2 may be applicable in an unsynchronized deployment, e.g., with possibly more than a first specific threshold, e.g., 33 µs, but less than a second specific threshold, e.g., 500 µs, between the start of overlapping transmissions.

PCM 3 (Power Configured Split):

PCM 3 based on a fixed split of the available transmission power (e.g., a hard split) may be considered/used for a WTRU configured for LTE Dual Connectivity with Short TTIs configured, NR Dual Connectivity, for LTE and NR tight interworking and/or for unlicensed operation where at least for cases that may be characterized such that different transmissions may have different numerologies and/or transmission (e.g., TTI) durations. In various embodiments, this PCM 3 may be applicable in an unsynchronized deployment, e.g., with possibly more than a first specific threshold, e.g., 33 μs, and less than a second specific threshold, e.g., 500 μs, between the start of overlapping transmissions. In PCM 3, the total available WTRU power may not be shared dynamically and/or efficiently.

Figure 7:
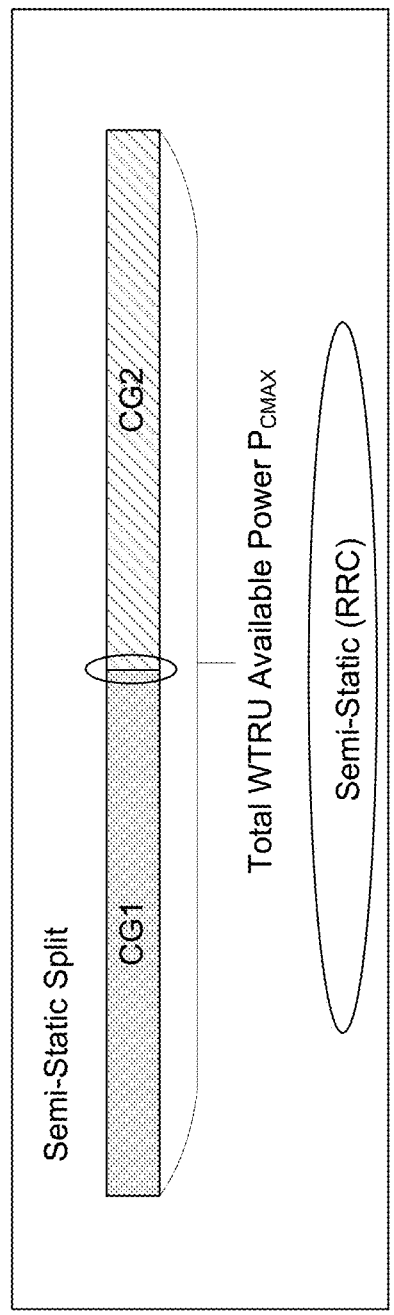
FIG. 7 is a diagram illustrating a representative power configured split.

FIG. 7 is a diagram illustrating a representative power configured split of a total WTRU available power. Referring to FIG. 7, the total WTRU available power may be split between or among a plurality of CGs. For example, a minimum transmission power or a maximum transmission power for the CGs (e.g., each CG) may be split of the total WTRU available power. The minimum and/or maximum transmission power for each CG may be (e.g., semi-statically) configured by signaling (e.g., semi-static signaling, L2 or higher signaling and/or RRC signaling). The total WTRU available power may be indicated by PCMAX as shown in FIG. 7. In certain representative embodiments (e.g., associated with the power configured split case), there may be no remaining power so it may not be possible to share the remaining power between CGs, for example, at least when transmissions of the CGs overlap between or among each other or among one another. The RRC signaling (e.g., via the RRC) may configure a fixed and/or semi-fixed (e.g., semi-static) split of the available transmission power.

PCM 4 (Dynamic/Adaptive Power Sharing):

PCM 4 may be useful, e.g., to maximize the WTRU's total available transmission power. PCM 4 may be useful for a WTRU configured with any of the above in terms of multi-connectivity, multi-RAT connectivity and with support for transmissions of different numerologies and/or transmission (e.g., TTI) durations. PCM 4 may be applicable for unlicensed operation, including stand-alone systems, EN-DC deployments and/or for other cases of dual connectivity. PCM 4 may be applicable to any deployment (e.g., synchronized or asynchronous).

Allocating transmission power may be generally based on knowledge of transmission parameters and actual power level for each transmission (e.g., PCM1 and PCM2). In various embodiments, a remaining power portion may be allocated based on knowledge of relative timing of the transmissions with respect to each other (e.g., PCM2). A WTRU may be configured to process scheduling information ahead of the allocation of the power level. Priorities and/or applicable guarantees may be either a fixed or semi-static configuration of the WTRU.

Representative Transmission Profile

In various embodiments, a transmission profile (TP) may be set and/or defined as a representation of one or more characteristics applicable to a transmission. The characteristics may include any of: a numerology, a sub-carrier spacing, values corresponding to delays and a time duration (e.g., TTI) applicable to the transmission. The delays represented by the values may be, or be based on, any number of time periods applicable to the transmission. The delays, for example, may be or be based on (i) a time period between a reception of downlink control signaling (e.g., a DCI) and a start of the transmission (indicated by a value N), and/or (ii) a time period between transmission of a transport block and transmission of the transport block associated feedback (e.g., K2), and (5) a time duration (e.g., TTI) applicable to the transmission. In various embodiments, a physical layer may be configured to determine an applicable TP as a function of the values associated with a transmission for one or more of the TP characteristics. For instance, the WTRU may be configured with multiple Transmission Profiles (TPs) to choose from, each TP including values for one or more parameters necessary to perform a transmission. The delay may be other time periods, as well.

In an embodiment, a PHY or other portion of a WTRU may be configured to, and may, determine the TP applicable to a particular transmission ("applicable TP") as a function of the parameters associated with (and/or characterize) the transmission. As an example, TP #1 may correspond to a first numerology (e.g., in terms of subcarrier spacing) combined with a first transmission duration (e.g., a mini-slot) with K2=3, the first transmission duration being 3 mini-slots. As another example, TP #2 may correspond to a second numerology combined with a second transmission duration (e.g., a subframe) with K2=1, the second transmission duration being one subframe, and so on. In an embodiment, the WTRU may obtain a TP (e.g., in scheduling information) and then may determine one or more parameters that characterize the transmission.

The characteristics may include one or more parameters for allocating the transmission power (e.g., a power offset/boost component, a priority when setting the power, or the like).

The characteristics may include an applicable configuration of a PHY. For example, the configuration may include an applicable set of physical resource blocks, a type of physical channel, beam-related information, or the like. In various embodiments, the beam-related information may correspond to any of: (1) a beam (or a set thereof), (2) a beam type, and (3) an identity a beam pair link (BPL). The BPL may correspond to a pair of beams, and the pair of beams may include one downlink beam and one uplink beam. A beam may be associated with, and the beam-related information may correspond to, one or more resources for reference signals. The reference signals may be, for example, CSI-RS (e.g., periodic, semi-static/dedicated, or aperiodic) and/or NR-Synchronization Sequence (NR-SS) (e.g., cell-specific).

The characteristics may include the type of access e.g., licensed or unlicensed. A PHY may determine the applicable TP as a function of whether a transmission occurs on physical resources associated to a frequency band for licensed operation or for unlicensed operation.

The characteristics may include the access method e.g., receive-before-transmit (e.g., such as in legacy 4G/LTE systems and/or 5G/NR systems in licensed frequency bands), LBT mechanism (e.g., frame-based or load-based) (e.g., such as in unlicensed frequency bands). A PHY may determine the applicable TP as a function of whether a transmission first requires performing LBT or not, before being scheduled from downlink control information on a downlink control channel and/or before being performed by/for the WTRU. In an embodiment, a PHY may determine the applicable TP as a function of: (i) what part of a timeline of the access method the transmission is scheduled for and/or (ii) the reception of a grant is received and/or the transmission may be performed e.g., for LBT access whether one or much such aspects is within a specific transmission opportunity, while in the CCA phase (e.g., for grant reception with cross-carrier scheduling) or if the transmission (or the reception of the scheduling information) is within some range of the maximum channel occupancy time.

In an embodiment, a PHY may determine the applicable TP as a function of whether a transmission corresponds to a grant received in the same transmission opportunity or if the transmission is for a different transmission opportunity.

In any embodiment, the WTRU may consider that the transmission is associated with a first TP if the first condition is met, or with a different TP otherwise.

In one embodiment, a TP may correspond to a configured index. The index may identify the transmission profile, may be received in a DCI, and/or may correspond to a specific WTRU processing. For example, the WTRU processing may include a determination of what data from what logical channel may be used for multiplexing in a transport block for the transmission. A TP may be characterized as a configuration aspect of the WTRU, e.g., by RRC signaling. The term transmission profile and any of the above characterization may be used interchangeably herein.

Representative Group of Transmissions (e.g., overload as CG, MCG, SCG)

In various embodiments, a group of transmissions may be set and/or defined as one or more transmissions associated with each other. For example, the one or more transmissions may overlap at least partly in time. For example, the one or more transmissions may correspond to any of: transmissions associated with a set of resources for example: (1) the resources may correspond to resources of a cell group (CG) (e.g., MCG, SCG)), (2) the resources may be associated with one or more control channel resources sets (CORESET), (3) the resources may be associated with one or more bandwidth part(s) (BWP), (4) the resources may be associated with a MAC entity, (5) the resources may be associated with a transmission profile, and/or (6) the resources may be associated with a specific numerology, time (e.g., TTI) duration, beam-related resources, or a combination thereof.

In various embodiments, beam-related information and/or beam-related resources may correspond to at least one of: (1) a beam (or a set thereof), (2) a beam type, and/or (3) a BPL identity where a pair may correspond to one downlink beam and one uplink beam. A beam may be associated with one or more resources for reference signals, for example CSI-RS (e.g., periodic, semi-static/dedicated, or aperiodic) and/or NR-SS (e.g., cell-specific). For example, the combination may consist of resources associated with a CG for transmissions of a given transmission profile. Such a combination may consist of or include resources associated with a CG for transmissions using a specific set of beams and/or BPLs.

In some representative embodiments, a WTRU may consider a guaranteed power level (e.g., for reservation of power to a group of transmissions), for example, when the WTRU determines that resources are active (e.g., a corresponding cell and/or carrier is in an activated state, a BWP is in the activated state, and/or a corresponding physical resource (e.g., bandwidth) is being processed by the WTRU at the time of the transmission). In other representative embodiments, a WTRU may consider the guaranteed power level (e.g., for reservation of power to a group of transmissions), for example, when the WTRU determines that the WTRU is decoding a CORESET for scheduling information for a time instant in which a transmission may occur. For example, one or more transmissions may correspond to transmission(s) associated with a transmission profile. For example, the one or more transmissions may correspond to transmission(s) associated with any of: (1) a specific power control loop (e.g., closed power control loop), (2) a WTRU's capability, a specific range of frequencies, and/or a hardware characteristic of the WTRU (e.g., a low or a high frequency RF chain, (3) a specific type of a reference signal (e.g., a CSI-RS, a demodulation (DM)-RS, NR-SS, a SS block, and/or a SS burst set, or the like) and/or a corresponding resource thereof, (4) a specific type of transmission (e.g., a PRACH transmission, a PUSCH transmission, and/or a PUCCH transmission), and/or (5) a format (e.g., specific format such as PUCCH format 1, format 3, or the like). The term group of transmissions and any of the above characterization may be used interchangeably herein.

In some representative embodiments, transmissions may be grouped according to any of various factors, which may include any of the following:

—Representative Transmission-Grouping Processing Time Factor(s)—

In a representative embodiment, transmissions for which a WTRU's processing time is below (and/or equal to) a threshold may be associated with a first group of transmissions, while transmissions for which the WTRU's processing time is above (and/or equal to) the threshold may be part of a second group of transmissions. The threshold may be pre-configured. In some representative embodiments, the WTRU's processing time may be a time between reception of control information (e.g., the grant in a DCI) and a start of the transmission.

The processing time may be based on a definition of a range of the processing time. The time range and/or thresholds may be a configuration aspect of the WTRU and/or may be based on dynamic information, e.g., K2 in the DCI. The time range and/or thresholds may, for example, enable a WTRU's configuration whereby a certain amount of guaranteed power may be allocated for transmissions, e.g., that are scheduled late and/or for which the WTRU has a particular processing time (e.g., very stringent processing time).

—Representative Transmission-Grouping Type of Scheduling Factor(s)—

In some representative embodiments, the type of scheduling may include slot-based scheduling and/or non-slot-based scheduling. With regard to slot-based scheduling, for example, the WTRU may be configured to decode resources of a control channel for scheduling information, e.g., DCI on a PDCCH using a first timeline (e.g., with a minimum time duration between each occasion equal to the duration of a slot which may be, for example, 0.5 ms, and/or for resources spanning between a few symbols in time). With regard to the non-slot-based scheduling, for example, the WTRU may be configured with PDCCH occasions of a duration of one or a few symbols following, e.g., a configured pattern within, e.g., a slot and/or a subframe.

In some representative embodiments, transmissions according to a first scheduling procedure (or a configuration thereof) may be associated with a first group of transmissions, and transmission associated with a second scheduling procedure may be associated with a second group of transmissions, for example, to enable a WTRU's configuration whereby a certain amount of guaranteed power may be allocated per scheduling procedure and/or for which the WTRU may have a particular processing time (e.g., a very stringent processing time).

—Representative Transmission-Grouping Transmission Type and/or Format Factor(s)—

In some representative embodiments, a transmission format for, e.g., a PUCCH may be characterized by one or more of: (1) applied transmission coding, (2) multiplexing, (3) scrambling, (4) mapping to physical resources, (5) a number and/or a range of payload, (6) a number of information bits, and/or (7) a selected codebook.

In some representative embodiments, a transmission performed according to a first PUCCH format may be associated with a first group of transmissions and a PUCCH transmission performed according to a second PUCCH format may be associated with a second group of transmissions, for example, to enable a WTRU's configuration whereby a certain amount of guaranteed power may be allocated for transmissions. For example, the first PUCCH format may be expected to have a higher power requirement (e.g., transmission power requirement) than for other formats (e.g., the second PUCCH format).

—Representative Transmission-Grouping Uplink Carrier Type and/or Identity Factor(s)—

In some representative embodiments, a transmission performed on uplink resources of a PUL may be associated with a first group and transmissions performed on a SUL may be associated with a different group of transmissions, for example, to enable a WTRU's configuration whereby a certain amount of guaranteed power may be allocated for transmission using a first set of resources (e.g. a SUL) that the WTRU is expected to use (e.g., while at cell edge).

—Representative Transmission-Grouping Physical Layer Resource Type Factor(s)—

In an embodiment, a transmission performed on uplink resources that correspond to a frequency band for licensed operation may be associated to a first group, and a transmission performed on uplink resources that correspond to a frequency band for unlicensed operation may be associated to a second group. Transmission grouping based at least in part on physical layer resource type factors may be used to configure a minimum guaranteed power level for transmissions for unlicensed operation.

—Representative Transmission-Grouping Access Type Factor(s)—

In an embodiment, transmissions performed on uplink resources that correspond to an access that first requires LBT (or CCA) before being scheduled from downlink control information on a downlink control channel and/or before being performed by the WTRU may be associated to a first group, and other transmissions may be associated to a second group. Transmission grouping based at least in part on such access type factor may be used to configure a minimum guaranteed power level for transmissions requiring LBT first e.g., with unlicensed operation.

In an embodiment, a transmission performed on uplink resources (e.g., for unlicensed operation) using an access that first requires LBT (or CCA) may be associated to a first group if the transmission (and/or its corresponding scheduling information) is performed within a specific transmission opportunity, if its corresponding scheduling information is received while in the CCA phase (e.g., for grant reception with cross-carrier scheduling) or if either (or both) is within some range of the maximum channel occupancy time for the corresponding transmission occasion. Transmission grouping based at least in part on such access type factor may be used to configure a minimum guaranteed power level (e.g., possibly higher than otherwise) for transmissions scheduled close to the end of the transmission opportunity e.g., with unlicensed operation.

The above factors to group transmissions may be in combination with one or more of the disclosed grouping methods/procedures.

B) Representative General Principles of Adaptive Power Control

In various embodiments, a WTRU may perform adaptation of one or more parameters that control power allocation for uplink transmissions.

B.1) Representative Adaptive Power Control

Adaptive Power Control may be applied to some or all of a WTRU's transmissions.

The transmissions may include one or more of a transmission on a physical uplink shared channel (e.g., the PUSCH), a transmission on a physical uplink control channel (e.g., the PUCCH), a transmission on a physical random access channel (e.g., the PRACH), a transmission of a reference signal (e.g., a sounding reference signal, SRS), a sidelink transmission or the like, for example in combination, e.g., when the transmissions, for example, overlap with each other in time.

Adaptive power control may be used to determine a power level for a transmission. The adaptive power control may rely on controlling or otherwise adapting power control formulae, and/or one or more components thereof ("power-control components"), based on an adaptation procedure, such as those disclosed herein supra and infra.

In various embodiments, controlling or otherwise adapting the power control formulae and/or power-control components may be carried out by controlling or otherwise adapting one or more parameters such as at least one of the following:

a) a target desired power. For example, this may correspond to a desired receive power $P_o$ and/or a coefficient applied thereto;

b) a compensation component. For example, this may correspond to a coefficient $\infty$ (e.g., in case of a PUSCH transmission);

c) an offset amount of power and/or a coefficient applied to a component related to a format of a transmission. For example, this may be an offset used to achieve a certain error rate and/or SINR, e.g., Δformat (e.g., for HARQ A/N, SR, CQI or combination on the PUCCH) or ΔMCS (e.g., the PUSCH);

d) an offset amount of power and/or a coefficient applied to a component related to the number of physical resources of a transmission. For example, this may be applied to a component that corresponds to the number "M" of RBs used for the transmission for the PUSCH; and/or e) a power adjustment. For example, this may correspond to an offset and/or a scaling factor (e.g., for power boosting). As another example, this may correspond to an adjustment applied to a TPC quantity.

The adaptation procedures disclosed herein supra and/or infra may be applied to different (e.g., per group) transmissions in terms of the above parameters, (e.g., for the purpose of increasing transmission robustness using power boosting, and/or adapting a necessary power of different transmissions when an amount of power may be shared for a group of transmissions). For example, certain uses or requirements for some transmissions (e.g., initial HARQ transmissions, and/or low priority/best-effort type of transmissions) may be decreased and the power (e.g., the necessary power) for other transmissions (e.g., a transmission nearing the maximum number of HARQ transmissions, higher priority transmissions, low latency transmissions, and/or highly reliable transmissions) may have increased power (e.g., by redistributing allocation of power according to a relative priority of the different transmissions.

In other embodiments, the power adaptation procedures may be applied as a function of scaling when a WTRU is power-limited. Certain embodiments may address different timelines, e.g., for possibly overlapping transmissions and constraints of the WTRU's processing time.

Representative Dynamic Adaptation to Parameters that Allocate a Portion of the Total WTRU Available Power Between Different Groups of Transmissions.

In various embodiments, one or more parameters may be dynamically adapted and/or controlled such that a WTRU may dynamically determine an applicable guaranteed power (e.g., minimum power level) for a group of transmissions, e.g., $P_{XeNB}$ and/or allocation of remaining power (if any) between different groups of transmissions.

$P_{XeNB}$ may be defined or set as a guaranteed power level for a group of transmissions "x," where x may be in a range [minimum, maximum] for the number of one or more configured groups of a WTRU's configuration inclusively. For example, the range [minimum, maximum] may be set as [2, 2] for dual connectivity. For example, the range [minimum, maximum] may be set as [2, 4] for dual connectivity where each MAC instance may be configured with 2 different TTI durations. It may be possible to set other values based on different combinations and/or based on the definition used for a group of transmissions.

Dynamic Changes to a Guaranteed Power for a Group of Transmissions

In various embodiments, a WTRU may dynamically determine a minimum guaranteed power level for a group of transmissions, e.g., $P_{XeNB}$. This may correspond to a ratio of the total available WTRU transmission power (e.g., $P_{CMAX}$) for a specific group of transmissions. In certain embodiments, the determination may be performed autonomously by the WTRU, controlled by the network from the reception of downlink control signaling or a combination of both. This may be performed according to the descriptions set forth herein.

Dynamic Changes to Allocation of a Remaining Power Between Groups of Transmissions In various embodiments, a WTRU may dynamically determine allocation of the remaining power (if any) between different groups of transmissions. The remaining power level may be determined based on the total WTRU available power (e.g., $P_{CMAX}$) less the amount of guaranteed power assigned to each group of transmissions. The amount of guaranteed power assigned to each group of transmissions may be semi-static or may vary. In various embodiments, the amount of guaranteed power assigned to each group of transmissions may vary, for example, in accordance with the descriptions set forth herein, for example, as applicable to the combination of both the allocation of remaining power and the determination of the guaranteed power. The determination may be performed autonomously by the WTRU, controlled by the network from the reception of downlink control signaling or a combination of both. This may be performed according to the descriptions set forth herein.

In various embodiments, the adaptation may be applied as a function of the transmission profile of transmissions, including a relative priority and/or a sequence in the HARQ transmissions.

In various embodiments, operations to a power allocation algorithm for controlling transmission power for a WTRU may include the following:

the WTRU autonomously adjusting a level of guaranteed power for one or more groups of transmissions;

the level of guaranteed power for a group of transmissions may vary between an upper limit and a lower limit; and/or the level of power adjustment to apply to a transmission (or to a group thereof) may be a function of previous scheduling activity and/or previous transmissions.

The above-described operations may include the use of a power allocation algorithm for controlling transmission power for a WTRU and may be realized, for example, using the descriptions set forth herein.

Representative Power Allocation by Dynamic Reservation

In various embodiments, power allocation by dynamic reservation may be dynamically signaled using downlink control information, as disclosed herein. Under representative adaptive power allocation with dynamic reservation:

a) reserved and/or guaranteed power level per group of transmissions (e.g., per CG, transmission profiles, type of transmissions, etc.) may be dynamically modified (e.g., decreased, reset or increased);

b) priorities may have been configured, for example, such that the WTRU may resolve possibly conflicting instructions originating, e.g., from different schedulers; and/or c) priority related to a "first in time" policy that may be applied based on, e.g., time of reception of the control signaling that schedules (or reserves) the transmissions. For example, a remaining power level may be assigned to transmissions for which a DCI has been received first in time.

Representative Power Allocation by Previous Scheduling and/or Power

In various embodiments, power allocation may be a function of any of a previous scheduling activity and/or a previous allocated power, as disclosed herein, such as any of:

a) in various embodiments, a WTRU may determine that the amount of guaranteed and/or reserved power (or similar) for a group of transmissions (e.g., per CG, transmission profiles, type of transmissions, etc.) may be modified (e.g., decreased, reset or increased) between a lower bound (e.g., low_guaranteed_power_bound) and an upper bound (e.g., high_guaranteed_power_bound);

b) in various embodiments, a WTRU may increase or decrease such an amount as a function of the amount of power effectively previously used for transmissions for the group of transmissions, for example, as an average over a certain amount of time (e.g., using a moving window);

c) in various embodiments, a WTRU may increase or decrease such an amount as a function of the amount of previously successfully decoded DCIs for a given set of control resources (e.g., a CORESET) for the group of transmissions, for example, as an average over a certain amount of time (e.g., using a moving window);

d) in various embodiments, the operation of additive increase that is disclosed herein may be applied when a WTRU determines that the WTRU has successfully received a DCI for a transmission for a group of transmissions (e.g., per CG, transmission profiles, type of transmissions, etc.) and/or upon another type of event (e.g., transmissions of higher priority than for other groups of transmissions, or some transmissions of the group not being served up to their required power level/scaling event); and/or e) in various embodiments, the operation of multiplicative decrease that is disclosed herein may be applied when the WTRU determines that is has not successfully received a DCI for a transmission for a group of transmissions (e.g., per CG, transmission profiles, type of transmissions, etc.) or upon another type of event (e.g., transmissions of higher priority than for other groups of transmissions, or all transmissions of the group being served up to their required power level/no scaling event has occurred for the group).

Representative Power Allocation by a Transmission Period

In various embodiments, power allocation may be a function of the power allocated to a previous transmission, for example, based on a time relationship in-between, for example, as disclosed herein. In certain embodiments, the power requirement/allocation level of a transmission of a given group (e.g., per CG, transmission profiles, type of transmissions, etc.) at time k (e.g., a mini-slot, a slot or a subframe) may be the same as for a previous transmission at time k-x, where x may be fixed (e.g., 5 or 6) or configured (e.g., by RRC signaling).

Representative Power Allocation Based on Access Method

In an embodiment, the power requirement and/or power allocation of a transmission of a given group (e.g. per CG, transmission profiles, type of transmissions, type of access method e.g., for transmissions requiring LBT, access timeline e.g., for transmissions performed within a transmission opportunity, etc.) may vary as a function of any of (i) a transmission opportunity, (ii) a minimum channel occupancy, (iii) a maximum channel occupancy, and (iv) an amount of time remaining in the (e.g., before the end of the corresponding) transmission opportunity.

As used herein, power allocation may refer to any of (i) values used to set the power of individual transmissions, (ii) a minimum guaranteed power for a given group of transmissions, and (iii) a maximum fraction of a WTRU's total available transmission power for a given group of transmissions.

B.2) Representative Configuration Aspects and Grouping

In certain representative embodiments, configuration aspects of one or more guaranteed power levels may be implemented, for example, where the sum of all guaranteed power levels is less than or equal to $P_{CMAX}$.

For example, a WTRU may be configured with one guaranteed power level (e.g., $P_{XeNB}$) or more than one guaranteed power level (e.g., $P_{MIN\_XeNB}$ and/or $P_{MAX\_XeNB}$) for a group of transmissions. For example, the WTRU may be configured such that the sum of all configured and/or applicable guaranteed levels is less than (e.g., in case that a remaining power is a non-zero value) or equal to (e.g., in case of no remaining power) the total WTRU available power (e.g., $P_{CMAX}$) at any given time.

In certain representative embodiments, other configuration aspects of one or more guaranteed power levels may be implemented, for example, where the sum of all guaranteed power levels may be higher than $P_{CMAX}$. For example, a WTRU may be configured with one guaranteed power level (e.g., $P_{XeNB}$) or more than one guaranteed power level (e.g., $P_{MIN\_XeNB}$ and/or $P_{MAX\_XeNB}$) for a group of transmissions. For example, the WTRU may be configured such that the sum of all configured and/or applicable guaranteed levels may at least sometimes exceed the total WTRU available power (e.g., $P_{CMAX}$). In such a case, the WTRU may apply one or more (e.g., additional) prioritization procedures, for example to determine which transmission's power or which transmissions' power to adjust (e.g., scale and/or assign less than an otherwise required power), for example, when the total required transmission power exceeds the total WTRU available power (e.g. $P_{CMAX}$). For example, the WTRU may be configured with different priorities, for example, based on or as a function of the grouping of the transmissions in accordance with any of the following aspects:

(1) a radio access and/or a RAT associated with the transmissions (for example, when there is a plurality of different RAT transmissions (e.g., LTE transmissions and NR transmissions), one RAT transmission may take precedence over one or more other RATs transmissions (e.g., LTE transmissions may have or may always have a higher priority than NR transmissions));

(2) a Cell Group associated with the transmissions (for example, when there are an MCG and an SCG). In some representative embodiments, the MCG may have or may always have a higher priority than the SCG);

(3) a type of data transmission (for example, data transmissions may or may not include control information (e.g., UCI, and/or RRC signaling, or the like). In some representative embodiments, transmissions with control information may have or may always have a higher priority than transmissions without control information);

(4) a type of channel (for example, different types of channels and/or signals such as transmissions on a physical control channel (e.g., a PUCCH, or the like), transmissions on a physical data channel (e.g., a PUSCH or the like) and/or a signal (e.g., a SRS or the like). In some representative embodiments, a control channel and/or transmissions on the control channel may have or may always have a higher priority than the others);

(5) a type of data service (for example, transmissions that include higher priority data may have or may always have a higher priority for power allocation);

(6) a type of access method (for example, transmissions for an access method that uses LBT (e.g., CCA) may have a different priority that other transmissions. In an embodiment, transmissions that first require LBT may have lower priority than that of other transmissions); and (7) a type of frequency band (for example, transmissions using resources of a carrier on a frequency band for licensed operation may have a different (e.g., higher) priority that those using resources of a carrier on a frequency band for unlicensed operation).

Although it is contemplated that the sum of the guaranteed powers is equal to or less than the total WTRU available power, the procedures and/or operations disclosed herein are equally applicable for when the WTRU is configured with the guaranteed powers having a sum that is greater than the total WTRU available power, such as when the WTRU is configured in accordance with one or more prioritization procedures/operations, e.g., as disclosed herein.

In certain representative embodiments, configuration aspects of guaranteed power levels with respect to multiple configurations per group may be implemented. For example, the WTRU may be configured with one set or range of guaranteed power levels (e.g., $P_{XeNB}$, and/or a range thereof) or more than one set of minimum/maximum guaranteed power levels (e.g., $P_{XeNB\_eMBB}$, $P_{XeNB\_URLLC}$, and/or a range thereof) for a group of transmissions. For example, transmission grouping may be associated with transmissions of a cell, transmissions of a BWP, and/or transmissions associated with a specific CORESET, or the like. For example, sets (e.g., each set) of minimum guaranteed power levels for a group of transmissions may correspond to one or more additional aspects related to transmission grouping (e.g., QoS of data, logical channel (LCH), transmission profile indication, and/or data service, or the like). For example, the WTRU may determine an applicable guaranteed power level as a function of certain aspects of the transmissions, and may use the determined guaranteed power level to allocate power for the transmissions. This may be applicable, for example when transmissions are grouped per cells of e.g., the WTRU's configuration and/or when the WTRU can determine such one or more additional aspects of the scheduled transmission. For example, in such a case, the WTRU may adjust the guaranteed power levels per set of guaranteed power levels. The WTRU may dynamically adjust the guaranteed power levels per set of guaranteed power levels, for example if such dynamic adaption is supported. For example, this may be (e.g., particularly) applicable, for example, when the sum of applicable levels (e.g., all applicable levels) may at least sometimes exceed the total WTRU available power.

In some representative embodiments, configuration aspects of guaranteed power levels with respect to multiple types of groups may be implemented. For example, the WTRU may be configured with a plurality of groups of transmissions, where one or more groups may be of a different type (e.g., a different group type) than other groups. The WTRU may be configured such that a group type may supersede one or more other group types. For example, the WTRU may be configured with a transmission group for preamble transmissions in addition to one or more groups of transmissions of a different type (e.g., such as other groups per cell). In such a case, the WTRU may perform the transmission of a preamble (e.g., associated with a transmission group "A") on resources of a cell of a SCG (e.g., which transmissions are otherwise associated with a transmission group "SCG") and apply the guaranteed power level of the preamble transmission grouping (e.g., group "A") instead of the guaranteed power level associated with the other group (e.g., of the SCG). It is contemplated that applying a specific treatment to a type of transmission (e.g., a higher priority to such transmissions) may be useful and/or desirable. In certain representative embodiments, the WTRU may determine that such transmissions (e.g., a preamble associated with the transmission group "A") have a higher priority than other transmissions of another group in which the transmission may also qualify (e.g., the SCG, for example in case that a preamble is transmitted on resources of the SCG), for example, which may allow the WTRU to subtract the power allocated to the preamble from that otherwise available to that other group.

C) Representative Adaptive Power Control

The following adaptive power control may be described in the context of 5G wireless systems (e.g., NR), without limitation to its applicability to other systems. The following adaptive power control disclosed below may be used in part, individually, in combination and/or in any order.

In various embodiments, the adaptive power control may be performed:
- per a group of transmissions, e.g., transmissions associated with a CG, a BWP, a MAC instance, a type/set of physical channels, a radio access technology (e.g., LTE and/or NR), a transmission profile (e.g., a transmission time (e.g., TTI) duration, one or more numerologies, a beam set, etc.);
- per a type of control channel that does the respective scheduling (e.g., CORESET);
- per a type of transmission (e.g., an initial HARQ transmission, a HARQ retransmission, the last transmission before reaching the maximum number of retransmissions for the HARQ process, etc.); and/or
- any combination of the above.

C.1) Representative Adaptive Power Allocation with Dynamic Reservation

In an embodiment, a WTRU may be configured with a power control mode. For example, the mode may correspond to PCM 4 above.

Representative Adjustment to a Guaranteed Power Level

In various embodiments, PCM 4 (or equivalent logic) may be aimed to realize an opportunistic use of the total WTRU's available power resources. With the PCM 4, the WTRU may adjust one or more guaranteed power levels as a function of at least one of:

—The Rate of Uplink Transmissions (and/or the Rate of Power Consumption) for a Group of Transmissions (e.g., Using a Window)—

In an embodiment, the WTRU may adjust power levels so as to avoid starvation of, grant and/or transmission opportunity loss associated with, and/or excessive retransmissions of groups of transmission having different rates of transmission and/or different moving average power consumptions. For example, in an embodiment in which a PCM implements fairness principles between different groups of transmissions, the WTRU may raise a power level associated with a group having a lower rate of transmission (and/or having a lower moving average power consumption), and may reduce a power level associated with a group having a higher rate of transmissions (or e.g., with a higher moving average power consumption). The WTRU may constrain the power level adjustments (raises and/or reductions) within corresponding ranges that are aimed at preventing (configured to prevent) unfairness between the different groups of transmissions. The power level adjustments (raises and/or reductions) and/or the constraints thereon that effect the fairness principles may be used, for example, when power sharing between different schedulers aims to enforce some form of load balancing.

As another example, in an embodiment in which a PCM favors opportunistic scheduling principles between different groups of transmissions, the WTRU may raise a power level associated with the group having a higher rate of transmissions (and/or having a higher moving average power consumption), and may reduce a power level associated with a group having a lower rate of transmissions (and/or having a lower moving average power consumption). The WTRU may constrain the power level adjustments (raises and/or reductions) within corresponding ranges that are aimed at preventing (configured to prevent) unfairness between the different groups of transmissions while favoring opportunistic scheduling principles between different groups of transmissions. The power level adjustments (raises and/or reductions) and/or the constraints thereon that effect the opportunistic scheduling principles may be used, for example, when power sharing between different schedulers aims to empty the buffers of a WTRU for a given group of transmissions as quickly as possible.

—The Access Properties for Uplink Transmissions—

In an embodiment, the access properties may include any of a minimum time until the start of the next occasion for accessing uplink resources for a transmission, a rate (and/or a moving average) of the occurrence such occasions and/or transmission opportunities, and a ratio (e.g., in time) of the availability of uplink resources within a given amount of time (and/or in a window). In an embodiment, the WTRU may adjust power levels so as to avoid starvation of, grant and/or transmission opportunity loss associated with, and/or excessive retransmissions of groups of transmission having different access properties for transmission. For example, in an embodiment, a WTRU configured for unlicensed operation may raise a power level associated with a group of transmissions having a longer average time between transmission opportunities. As another example, in an embodiment, a WTRU configured for unlicensed operation may reduce a power level associated with a group of transmissions having a shorter average time between transmission opportunities. As further example, in an embodiment, a WTRU configured for unlicensed operation may raise a power level associated with a group of transmissions having a longer average time for channel occupancy. As another example, in an embodiment, a WTRU configured for unlicensed operation may reduce a power level associated with a group of transmissions having a shorter average time for channel occupancy. In embodiments in accordance with the examples herein, the WTRU may constrain the power level adjustments (raises and/or reductions) within corresponding ranges that are aimed at preventing (configured to prevent) unfairness between different groups of transmissions.

—One or More Power Scaling Events for the Group—

In certain embodiments, the power scaling may occur while (e.g., only while) the WTRU is not configured to use the maximum configured guaranteed power for the group (e.g., to react to an insufficient power level setting);

—Explicit Control Signaling Received on a Downlink Control Channel (e.g., a DCI)—

In certain embodiments, the signaling may be applicable (e.g., only applicable) on a specific control channel (e.g., CORESET) and/or for a specific group of transmissions. For example, the signaling may indicate (e.g., by an index to a configuration and/or to a value) at least one of the following:
  a) a step unit increase or decrease of a guaranteed level;
  b) an indication to move to an upper value, e.g., using an (index to an) absolute value or an indication, e.g., $P_{MAX\_XeNB}$ as disclosed below;
  c) an indication to move to a lower value, e.g., using an (index to an) absolute value or an indication, e.g., $P_{MIN\_XeNB}$ as disclosed below;
  d) an indication for a specific configuration of the power control mode, e.g., according to the parameters below, for example using an index to the configuration;
  e) grant information as a reservation. In certain embodiments, the WTRU may receive sufficient scheduling information to determine a power level for one or more transmissions and may not be requested to perform the transmission. The WTRU may then use such grant information in the determination of the power allocation to perform a transmission-based reservation. In other embodiments, the reservation may last for one or multiple transmission occasions, which may be a configuration process of the WTRU and/or indicated in the received signaling. The reservation may be for a specific group of transmissions. For example, the reservation may expire when the WTRU receives a grant for the group of transmissions. The grant reservation may be useful, for example, to ensure that power corresponding to a possible transmission may be available for the group, if useful and/or necessary. In an embodiment, the grant reservation may be considered in adjusting one or more guaranteed power levels as if the WTRU had been scheduled to perform a transmission. The grant reservation may be useful for the network, for example, to more accurately control the adjustments in the WTRU's power control implementation.
  f) a priority adjustment. In certain embodiments, the WTRU may receive priority information, for example, with grant information. The WTRU may use the indication to update the priority of a group of transmissions.

—Beam Management or Beam-Related Events—

In certain embodiments, a WTRU may be configured to determine to adjust one or more guaranteed power levels (e.g., by setting a guaranteed power level to any level, including zero) as a function of at least one of the following:
  (a) The WTRU may determine that the WTRU has no valid downlink (DL) timing reference for any uplink beam in a set of one or more uplink beams and/or BPL for a group of transmissions (e.g., per CG, transmission profiles, type of transmissions, etc.). In an embodiment, a DL beam used as a reference may be part of the set of one or more uplink beams and/or BPL for the group;
  (b) The WTRU may determine that the WTRU has no valid downlink pathloss reference for any uplink beam in the set of one or more uplink beams and/or BPL for the group of transmissions. In various embodiments, a DL beam used as a reference may be part of the set of one or more uplink beams and/or BPL for the group;
  (c) The WTRU may determine insufficient beam link quality (e.g., indicated by measurements) for the set of one or more uplink beams and/or BPL for the group of transmissions. In various embodiments, the WTRU may determine that the Layer 3 measurements (e.g., the averaged measurement for N best beams in the set) is less than a threshold value. The threshold value may be configured by signaling. In other embodiments, the WTRU may determine that the Layer 1 measurement is less than a threshold value. The threshold value may be configured by signaling. The Layer 1 measurements may be performed or obtained, e.g., using applicable CSI-RS for a beam (or set thereof, when a single measurement is performed for multiple beams using a CSI-RS resource) or cell-specific SS. In various embodiments, the Layer 1 measurements may be performed or obtained, e.g., using applicable CSI-RS for all beams of the set/BPL. Applicable CSI-RS may include CSI-RS on periodic resources (e.g., for pathloss estimation, timing alignment tracking, RSRP measurements), on semi-static configured resources (e.g., possibly for improvements to RSRP measurements), and/or on aperiodic scheduled resources (e.g., possibly to further improve RSRP measurements);
  (d) The WTRU may determine that some or the whole of the uplink beams are unavailable for the set of one or more uplink beams and/or BPL for the group of transmissions, e.g., in a failure state;
  (e) The WTRU may determine that beam recovery is ongoing for the set of one or more uplink beams and/or BPL for the group of transmissions; and
  (f) The WTRU may determine that beam change (e.g., switch) and/or modification (e.g., reconfiguration) are ongoing for the set of one or more uplink beams and/or BPL for the group of transmissions, for example if such makes those beams unavailable for transmission.

In various embodiments, the WTRU may determine to adjust one or more guaranteed power levels (e.g., set to a non-zero, a default value, or an initial value) when the WTRU determines that any (or all) of the above conditions disclosed in beam management or beam-related events (a)-(f) are no longer true. In various embodiments, the WTRU may determine that beam recovery has been successfully performed or completed for the set of one or more uplink beams and/or BPL for the group and may adjust a corresponding guaranteed power level to the initial (e.g., possibly configured) value for the group.

Representative Parameters Applicable to Dynamic Power Control Adjustments

In various embodiments, a WTRU may be configured with one or more parameters that control the WTRU's allocation of power for uplink transmissions. For example, the parameters may include at least one of:

—A Minimum Guaranteed Power (e.g., $P_{MIN\_XeNB}$):

This value may be configured for a group of transmissions (e.g., per XCG). In various embodiments, XCG may correspond to a MCG, a SCG or any other grouping of transmissions. This value may correspond to the minimum possible share or fraction of the total available WTRU transmission power (e.g., $P_{CMAX}$) that may be allowed for the group, e.g., when using PCM 4.

A value of 0 may be configured for a group of transmissions of low priority. For example, this may be for a group associated with a secondary group, e.g., a SCG. For example, this may be for a group that may not include control signaling, e.g., for data radio bearers (DRBs). For example, this may be for a group that may not include data from specific services and/or transmission profiles, e.g., for eMBB and/or for specific QoS scheduling strategies that are more for best-effort type of transmissions.

In various embodiments, the WTRU may determine after a certain period of (e.g., scheduling and/or transmission) inactivity for the group of transmissions that the guaranteed power may be set to the minimum value (e.g., 0). In exemplary embodiments, when the WTRU is configured to perform a transmission for the group, it may then be possible that the first transmission following an inactive period may lead to insufficient (possibly 0) transmission power, in which case the power control function may be configured to ensure that the level of guaranteed power can quickly (e.g., quickly enough) increase to a sufficient level, e.g., upper bounded by a maximum guaranteed power, as set forth below.

—A Maximum Guaranteed Power (e.g., $P_{MAX\_XeNB}$):

This value may be configured for a group of transmissions (e.g., per XCG). In various embodiments, XCG may correspond to an MCG, an SCG or any other grouping of transmissions. This value may correspond to the maximum possible share or fraction of the total available WTRU transmission power (e.g., $P_{CMAX}$) that may be allowed for the group, e.g., when using PCM 4. A value of 100% (or infinity) may be configured for a group of transmissions of high priority. For example, this may be for a group associated with a primary group, e.g., a MCG. For example, this may be for a group that may include control signaling, e.g., for SRBs. For example, this may be for a group that may include data from specific services and/or transmission profiles, e.g., for URLLC and/or for specific QoS scheduling strategies.

In certain embodiments, a WTRU may determine after a certain period of (e.g., scheduling and/or transmission) activity, for example with a specific intensity, for the group of transmissions that the guaranteed power may be increased gradually towards the maximum value (e.g., 100%). In various embodiments, levels associated with other group(s) of the WTRU's configuration may decrease sufficiently to enable this increase, e.g., when the group is predominantly active in transmissions. In another embodiment, when the WTRU determines to increase the guaranteed level for one or more other groups (e.g., when scheduling may resume for the other groups), the WTRU may decrease the guaranteed level accordingly.

Representative Overview of WTRU Logic for Dynamic Power Level Adjustments

In various embodiments, the WTRU may perform adjustment of the guaranteed power level(s). In certain embodiments, the adjustments may be specific to the power control parameters associated with a specific group of transmissions. For example, within a group of transmissions, further allocation of power between possibly overlapping transmissions may be performed according to the operations of PCM 1 (e.g., carrier aggregation in a MCG where the operation is relatively synchronous in terms of scheduling information and/or start of the overlapping transmissions) and/or PCM 2/PCM 3 (e.g., other cases such as dual connectivity between LTE and NR, NR and NR, Carrier Aggregation with TTIs of different durations, or the like).

In another embodiment, the rate of the adjustment may be: a function of a window size (e.g., a sampling period for events), the inter-packet/burst, the maximum acceptable latency (e.g., similar to the discard timer which controls the maximum time to reach sufficient transmission power—may be the round trip time (RTT) of the group, e.g., the maximum time for the level to reach an acceptable value in time for the next retransmission), and/or control signaling, e.g., explicit adjustments.

Representative Events Considered for Adjusting a Guaranteed Power Level

In various embodiments, a WTRU may consider at least one of the following events for the adjustments:

—Reception of Uplink Scheduling Information—

In various embodiments, a WTRU may receive a DCI indicating resource allocation information for an uplink transmission for a group of transmissions. The WTRU may consider these events in determining an increase to a current level for the group of transmissions. In certain embodiments, the WTRU may consider the events when the current guaranteed power level for the group of transmission is below a maximum threshold, e.g., $P_{MAX\_XeNB}$.

—Allocation of Power to an Uplink Transmission—

In various embodiments, a WTRU may allocate uplink transmission power to one or more transmissions of a group of transmissions. This may be irrespective of whether or not downlink scheduling information has been received, e.g., for a preamble sent on a PRACH resources, for a grantless transmission and/or for a semi-persistent or configured grant. In certain embodiments, the WTRU may consider such event in determining an increase to the current level for the group of transmissions. In another embodiment, the WTRU may consider the events when the current guaranteed power level for the group of transmission is below a maximum threshold, e.g., $P_{MAX\_XeNB}$.

—Adjustment(s) in Another Group of Transmission (Increase/Decrease)—

In various embodiments, a WTRU may determine that a guaranteed power level for a group of transmission may be changed. In certain embodiments, when an event may have occurred for a first group where an increase of the power level may be performed with higher priority (e.g., for a URLLC transmission) and there is no available remaining power (for an increase event), the WTRU may decrease the power level of a second, lower priority group of transmissions that is not currently at the minimum level for the second group.

In various embodiments, the WTRU may determine to decrease the guaranteed power level of a group of transmissions (a decrease event). In such case, the amount of power released from guarantees may be reassigned to (e.g., guaranteed power level of) another group of transmissions.

—Adjustment(s) to the Amount of Remaining Power—

In various embodiments, a WTRU may determine to decrease the guaranteed power level of a group of transmissions. In this case, the amount of remaining power may increase, accordingly. Such non-zero amount of remaining power may be available to one or more other groups of transmissions for which the current guaranteed level is currently and/or becomes less than the maximum level for the group (for an increase event). The remaining power may be allocated to guaranteed levels of such groups, for example, according to a priority ordering (e.g., configured) of the different other groups. In various embodiments, the distribution of the remaining power may be performed, for example when an increase event is determined to be performed, e.g., according to other events for the group(s) and/or according to their respective management, e.g., there was at least one increase event for the current window and which has not yet led to an increase in the current guaranteed power level for the group.

—Received Signaling Indicating Changes—

In various embodiments, a WTRU may receive a power control indication that modifies one or more guarantee levels of one or more groups of transmissions. This may be applied based on respective priorities between the groups, e.g., if there is an insufficient amount of remaining power. This may correspond to either an increase event or a decrease event for the group(s) of transmissions according to the received signaling indicating changes.

—Power Scaling Applied for a Group of Transmissions Based on a Certain Condition—

In various embodiments, the condition may include that a WTRU is not using all available power, e.g., the guaranteed power level may be higher than necessary for other groups of transmissions or the other groups may be inactive in transmissions. The other groups may include, for example, groups of a priority no higher (or less) than that of the group of transmissions for which power scaling has occurred. In another embodiment, the condition may include that the WTRU has at least one other group of a priority no higher (or less) than that of the group of transmissions for which power scaling has occurred with a guaranteed level above the minimum level for the one or more groups. The WTRU may consider the event in the determination of an increase to the current level for a group of transmissions.

—Power Scaling for All Groups of Transmissions Active with Transmissions—

In various embodiments, a WTRU may determine that it is power-limited, e.g., even if sharing all available power would be ideal. The WTRU may then determine to back off different groups of transmissions to the minimum level (e.g., to an even lower level, e.g., zero). In certain embodiments, the adjustments may be performed starting from the group of transmissions with lowest priority and in increasing order of priority. In other embodiments, all available power may be made available to a specific (e.g., configured) group of transmissions, e.g., a primary group of transmission (e.g., the MCG and/or the PCell of the MCG).

—RLF/RLM-Related Events—

In various embodiments, a WTRU may determine that quality of the physical resources and/or channels of a specific group of transmissions may be below a certain threshold. For example, an RLF event for a group of transmissions that may carry control plane signaling (e.g., only SRB0, SRB1 and/or SRB2, e.g., for the MeNB) may lead to a re-establishment of the control plane using the principles of single connectivity. The event may occur for other group(s) of transmissions. In this case, the WTRU may perform adjustments of the guaranteed levels such that the guaranteed power level of the group(s) may be decreased (e.g., down to 0). The difference may be re-assigned to another group of transmissions, e.g., to skew in favor of a group of transmissions with higher priority.

—Beam Blockage and/or Beam Management Operations—

In various embodiments, a WTRU may determine that quality of the physical resources and/or channels of a specific group of transmissions may be below a certain threshold due to beamforming problems (e.g., blockage, loss of synchronization, etc.). In this case, the WTRU may perform similar actions as disclosed for RLF/RLM events for the group of transmissions.

—Other Impairments—

In various embodiments, a WTRU may determine that an error case occurred in relation to the physical resources, channels, procedures, or similar matters associated with a specific group of transmissions. For example, this may include a failure to successfully complete a random access procedure for the group. For example, this may include a failure to successfully complete a scheduling request procedure. For example, this may include loss of uplink timing alignment, e.g., expiration of a timing alignment timer associated with the group of transmissions. For example, this may include loss (or failure to track/detect) a timing reference for the group of transmissions. For example, this may include loss (or failure to track/detect) a path loss reference for the group of transmissions. For example, this may include loss (or failure to track/detect) a reference signal, e.g., for the purpose of beam management for the group of transmissions. In such cases, the WTRU may perform similar actions as disclosed for RLF/RLM event for the group of transmissions.

—Accumulated Consumed Power—

In various embodiments, a WTRU may determine that a certain amount of power has been consumed for a specific group of transmission. In certain embodiments, when reaching such (e.g., configured) a threshold, the WTRU may determine that it may decrease the current guaranteed power level for the group of transmissions (e.g., for a certain period).

—Accumulated Prioritized Power—

In various embodiments, a WTRU may determine that it has not consumed a certain amount of power during a specific amount of time. This may be based on a configuration of a prioritized power rate for the accumulation of a prioritized amount and a bucket duration. In various embodiments, the WTRU may determine that it may increase a level of guaranteed power for the group of transmissions when the amount of prioritized power reaches a certain amount (e.g., for a certain period).

In various embodiments, this may be applicable in combination with the event for the accumulated transmission power, for example where the increase in guaranteed power level may be according to the prioritized power rate and its accumulated (e.g., a credit-based mechanism) and a decrease in guaranteed power level may be according to the accumulated consumed power (e.g., a debit mechanism) for a given period. In another embodiment, such events may be defined per group of transmissions.

Representative Maintenance of a Guaranteed Power Level

Representative Period-Based Updates

In various embodiments, a WTRU may perform one adjustment per a period of time. The period of time may be included in a configuration of the WTRU. The period of time may be configured for each group of transmissions. The WTRU may perform one such adjustment per group of transmissions. The period of time, or window (e.g., as further disclosed below) may control latency of the adjustment for a group of transmissions, for example, the responsiveness of the algorithm for the group of transmissions. In other embodiments, the period of time may be in a time unit that corresponds to the minimum TTI duration for the group of transmissions. In other embodiments, the period of time may correspond to a default time unit, for example a subframe duration (e.g., 1 ms).

Representative Window-Based Operation

In various embodiments, a WTRU may perform adjustments using a window-based operation. In certain embodiments, a WTRU may perform at most one adjustment per window of time for a given type of event (e.g., increase or decrease). The WTRU may perform an adjustment immediately for some events, e.g., events related to a failure case and/or an impairment-related event.

Representative Additive Increase—by a Factor

In various embodiments, a WTRU may perform the one adjustment as an increase of a guaranteed power level by adding a fixed, possibly configured, amount. For example, the value may be equal to $1/10^{th}$ of $P_{CMAX}$. The updated guaranteed power level following an increase may be upper bounded by a value (e.g., $P_{MAX\_XeNB}$) as disclosed.

Representative Multiplicative Increase—by a Multiple of a Factor

In various embodiments, a WTRU may adjust to increase a guaranteed power level by adding an integer multiple of a fixed, e.g., configured, amount. For example, the WTRU may double its current guaranteed power level. For example, the integer multiple may correspond to the number of consecutive increase events. The increase may be upper bounded by a value (e.g., $P_{MAX\_XeNB}$). The updated guaranteed power level following an increase may be upper bounded by a value (e.g., $P_{MAX\_XeNB}$) as disclosed.

In other embodiments, the WTRU may adjust to increase a guaranteed power level by doubling the current guaranteed power level. In certain embodiments, doubling the guaranteed power level may be performed upon a specific event (e.g., an initial transmission), e.g., for a given window and/or period, following a certain period of inactivity, when the current level for the group of transmission may be equal to $P_{MIN\_XeNB}$ and/or when the current level for the group of transmissions is zero. The updated guaranteed power level following an increase may be upper bounded by a value (e.g., $P_{MAX\_XeNB}$) as described earlier.

Representative Sequential Increase—Moving Through a Sequence

In various embodiments, a WTRU may adjust by moving forward sequentially through a list of values, e.g., 20, 30, 40, 50, for example where $P_{MIN\_XeNB}=20$ and $P_{MAX\_XeNB}=50$.

Representative Subtractive Decrease—by a Factor

In various embodiments, a WTRU may adjust to decrease a guaranteed power level by subtracting a fixed, e.g., configured, amount. For example, the value may be equal to $1/10^{th}$ of $P_{CMAX}$. The updated guaranteed power level following a decrease may be lower bounded by a value (e.g., $P_{MIN\_XeNB}$) as disclosed.

Representative Multiplicative Decrease—by a Multiple of a Factor

In various embodiments, a WTRU may adjust to decrease a guaranteed power level by subtracting an integer multiple of a fixed, e.g., configured, amount. For example, the integer multiple may correspond to the number of consecutive decrease events. The decrease may be lower bounded by a value, e.g., $P_{MIN\_XeNB}$. The updated guaranteed power level following a decrease may be lower bounded by a value (e.g., $P_{MIN\_XeNB}$) as disclosed.

Representative Sequential Decrease—Moving Through a Sequence

In various embodiments, a WTRU may perform the adjustment by moving backwards sequentially through a list of values, e.g., 20, 30, 40, 50, for example where $P_{MIN\_XeNB}=20$ and $P_{MAX\_XeNB}=50$.

Representative Increase/Decrease of a Power Level

In various embodiments, increasing and decreasing a guaranteed power level may be specific to a group of transmissions. This may be useful to control the rate of adjustment per group of transmissions, e.g., the reactiveness of the algorithm for the group of transmissions.

Representative Additional Conditions for Adjusting Guaranteed Power Levels

For any event for which the WTRU may determine that an adjustment may be performed, additional conditions may be considered including at least one of the following:

a level of the remaining power, for example whether or not the amount of remaining power is non-zero. In various embodiments, the WTRU may perform the determination after processing of any events that may lead to a decrease of the guaranteed power level for other groups of transmissions, if any; and/or a relative priority between different group of transmissions, for example whether or not the current group has a higher priority than other groups for which an adjustment may also be applicable, if any.

Representative Configured Uplink Grants

In various embodiments, a WTRU may consider that a power level that may be used and/or necessary for a configured uplink grant may be considered as reserved for the group of transmissions. In other embodiments, the WTRU may include the grant and allocate power to the transmission independently of the guaranteed power level for the group. This may result in power allocated within a range (e.g., not exceeding $P_{MAX\_XeNB}$ for the group) and for a period (e.g., TTIs, e.g., mini-slots, slots and/or subframes) of the configured transmission as well as the period for which the transmission overlaps for TTIs before and after the transmission time for the configured uplink grant. In an embodiment, the transmission may be further considered as an event similar to dynamic scheduling, for example, to enable some power level increase (if applicable) for potential HARQ retransmissions. In another embodiment, the transmission may be excluded from the considered events for the rate adjustments.

Representative Grantless Transmissions

In various embodiments, a WTRU may perform a grantless transmission, e.g., a transmission where the WTRU may autonomously determine timing of the transmission. In this case, the WTRU may perform a behavior similar to that for a configured grant.

Representative Channel-Specific (e.g., PRACH)

In various embodiments, a WTRU may perform a transmission on a specific physical channel set of resources and/or for a specific procedure. For example, the WTRU may perform the transmission of a preamble on the PRACH. The transmission may be given higher priority. In other embodiments, the WTRU may assign as much transmission power as possible and/or required independently of the guaranteed levels. In various embodiments, a transmission on the PRACH may be considered as an event. The transmission on the PRACH may be performed for a transmission group. In other embodiments, the transmission on the PRACH may be performed when the preamble is transmitted for the purpose of acquiring uplink transmission resources, e.g., triggered by reception of a DCI (e.g., Physical Downlink Control Channel (PDCCH) order for downlink data arrival) or by a scheduling request (e.g., RA-SR), e.g., not for requesting system information. In various embodiments, the priority may be per a group of transmissions and/or per a set of PRACH resources (if applicable).

In other embodiments, the WTRU may use similar procedures/operations as disclosed to autonomously adjust the priorities associated with a group of transmissions. Priorities may be adjusted within a range of values, for example this range may be specific to a group of transmissions. For example, this may be useful if PCM 4 is set/defined as an extension of PCM 1 principles/operations, e.g., in a synchronous deployment.

C.2) Representative Adaptive Power Allocation by Scheduling/Transmission Activity In various embodiments, a WTRU may be configured with a power control mode. For example, the mode may correspond to a variant of the PCM 4 disclosed above. This variant may be based on inactivity timers.

In certain embodiments, the WTRU may start an inactivity timer when it determines that a first transmission may be performed. The inactivity timer may be configured on the WTRU. The inactivity timer may be applied per group of transmissions. The inactivity timer may be started from the time the WTRU receives the DCI, or at the time of the corresponding transmission. In another embodiment, if not running, the inactivity timer may be started for a first transmission a group of transmissions; otherwise, the WTRU may restart the inactivity timer.

In various embodiments, the WTRU may determine to use a first specific guaranteed power level while the timer is running. For example, this may correspond to $P_{MAX\_XeNB}$ or similar. In other embodiments, the WTRU may determine the guaranteed power level using a second specific guaranteed power level. For example, this may correspond to $P_{MIN\_XeNB}$ or similar.

In other embodiments, the WTRU may use events similar to those disclosed herein to determine when to start or re-start the inactivity timer, e.g., such as events that would lead to an increase of the guaranteed power level. For example, the WTRU may stop the inactivity timer for events that may lead to a decrease of the guaranteed power level.

C.3) Representative Power Allocation by Time-Dependency

Representative PCM 2: "First in time" becomes "first to DCI"

In various embodiments, a WTRU may be configured with a power control mode similar to PCM 2, for example, where the remaining power may be assigned to a group of transmissions as a function of the time of reception of the downlink control information (DCI), where the remaining power is first made available to a group of transmissions that was scheduled (e.g., based on the starting symbol of the first successfully decoded DCI) instead of a time-based operation in which the first to start a transmission in time is provide the allocation.

Representative Linkage to Previous Transmission

Figure 8:
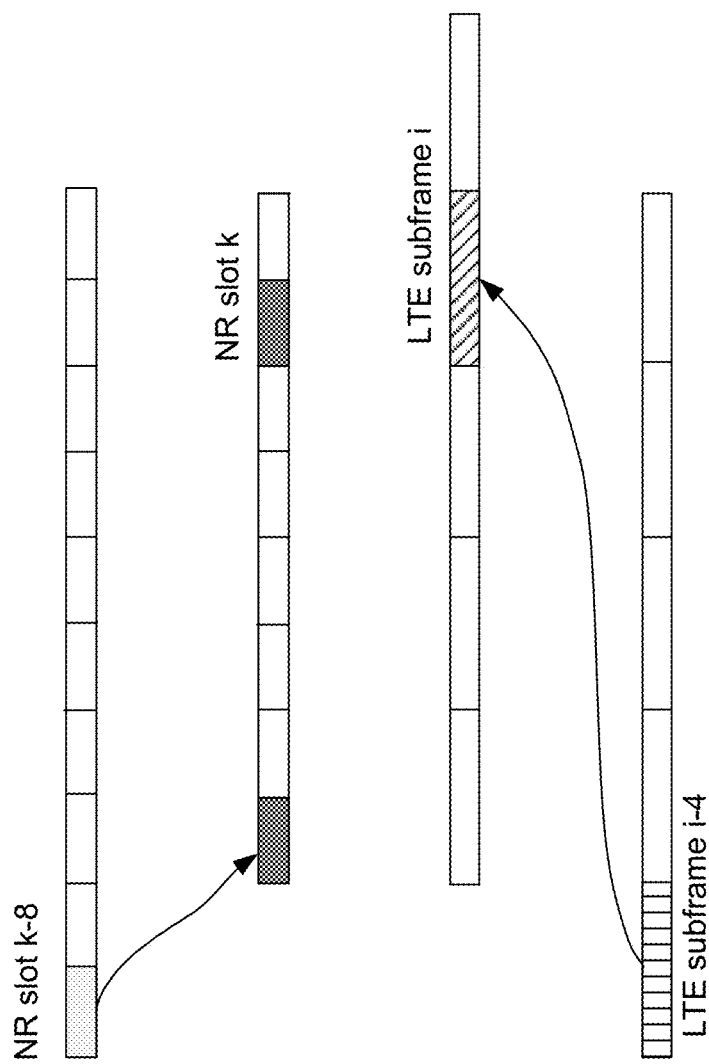
FIG. 8 is a block diagram illustrating a representative transmission in dual connectivity (e.g., based on Long Term Evolution (LTE) and NR)

In various embodiments, a WTRU may perform an autonomous determination of power sharing/power reservation levels as a function of any of:

a relationship between power allocation of initial transmission for a HARQ process and its retransmissions (e.g., at least the same guaranteed level may be used, or priority, for a retransmission as used for the initial transmission). In an embodiment, this may be based on the New Data Indication (NDI) determined from the scheduling information.

a relationship with a previous transmission. In various embodiments, in LTE and NR interworking (dual connectivity with LTE as the MeNB) as illustrated in FIG. 8, a NR slot may be considered as lasting 0.5 ms and a DCI-to-grant delay of 2 slots for NR. When it attempts to minimize changes to the LTE part of the modem, no look-ahead may be allowed for LTE. FIG. 8 is a block diagram illustrating a representative transmission in dual connectivity (e.g., based on LTE and NR). Referring to FIG. 8, power allocation by time-dependency, e.g., a timing relationship between reception of an uplink grant 801 in NR (e.g. at NR slot k-8) and its corresponding transmission 803, are shown. Also shown is a timing relationship between the reception of an uplink grant in LTE 805 (e.g., in LTE subframe i-4) and its corresponding transmission 807 in LTE subframe i. FIG. 8 illustrates two overlapping transmissions, one in NR slot k and one in LTE subframe i. To determine the power of LTE subframe i, the WTRU may use the knowledge of NR grants up to NR slot k-7. The actual power requirement of NR in slot k may be known after NR slot k-2. In this case, there may be the following options:

Option 1 is to allow LTE to use all of the remaining power during the time period corresponding to LTE subframe i. This effectively may mean that LTE always has priority over NR. In various embodiments, this may be good in an EN-DC scenario with an LTE master. If NR is used for URLLC, a large guaranteed power may need to be configured.

Option 2 is to reduce the unfairness, assuming that power requirement of NR in NR slot k is the same as in NR slot k-6 (or k-5). Power may be wasted in NR power requirement decreases between slot k-5 and slot k.

In various embodiments, the power allocation of LTE in subframe i could take into account the actual transmission in NR slot k. In an embodiment, a decision on whether to scale down some LTE transmissions may be done at the same time as NR. This may be feasible, although it may however be preferable to avoid mixing the different timelines.

Representative Power Allocation Based on Access Method

In an embodiment, a WTRU may determine values of parameters for calculating a power requirement and/or power allocation of a transmission as a function of an access/scheduling timeline. The parameters may include any of a target desired power, a compensation component, an offset amount of power and a power adjustment, such as those disclosed herein supra and/or infra.

In an embodiment, a WTRU may make changes to the parameters as a function of access. The WTRU may make any of the changes autonomously and/or on a dynamic basis. For example, for unlicensed operation, the WTRU may apply one or more different values for the parameters as a function of an access/scheduling timeline. In an embodiment, the WTRU may change to (and/or apply) different (e.g., higher) values for any of the parameters, including any of the target desired power, compensation component, offset amount of power and power adjustment, if (i) the transmission (and/or its corresponding scheduling information) is performed within a specific transmission opportunity, (ii) the corresponding scheduling information is received while in the CCA phase (e.g., for grant reception with cross-carrier scheduling), and/or (iii) the transmission is scheduled within some range of the maximum channel occupancy time for the corresponding transmission occasion. The changes to, and application of, the different values may be used to enable power boosting for a transmission close to the end of a transmission opportunity. The power boosting may be used to increase a likelihood for successful decoding of the transmission by a receiver (e.g., the gNB) and/or to lower a likelihood that a retransmission may be subsequently needed for concerned transport block(s).

In an embodiment, a WTRU may determine whether or not there may be possible overlap between two transmissions as a function of an access method. In an embodiment, the WTRU may consider a duration corresponding to a transmission opportunity for a first transmission in carrying out a determination of possible overlap with a second transmission. In an embodiment, the WTRU may determine a "possible overlap duration" that may correspond to the shortest possible time until the channel may be acquired for a first transmission. In an embodiment, the duration may include an additional time component and/or factor (collectively "additional time component/factor"). In an embodiment, the additional time component/factor may correspond to a WTRU processing time, such as a minimum time for receiving an indication and for determining a time (e.g., an exact time) of transmission within the transmission opportunity. In an embodiment, the additional time component/factor may include a channel occupancy time (or an estimation thereof). For example, the WTRU may consider any of a minimum channel occupancy time, an average channel occupancy time and a maximum channel occupancy time.

In an embodiment, the WTRU may consider that a first transmission is "scheduled" when it receives scheduling information that enables a determination of and/or that includes power requirements for the transmission. In an embodiment, the scheduling information might not indicate a starting time/symbol (e.g., an exact starting time/symbol) of the first transmission at the time of reception of such information. Conditions under which this may occur is when a WTRU is configured for unlicensed operation and/or for LBT access and the scheduling information may be received by the WTRU prior to acquisition of a corresponding channel and/or before timing (e.g., start/end times) of the corresponding transmission opportunity is known.

In an embodiment, the WTRU may allocate power to a second transmission (e.g., one or more transmissions of other groups of transmissions) that overlaps in time with the transmission opportunity of a "scheduled" first transmission. In an embodiment, the WTRU may consider the power level associated with the group of transmissions of the concerned "scheduled" first transmission to be applicable for the duration of the transmission opportunity of the first transmission when assigning power to such other second transmissions. Alternatively, the WTRU may determine that the power level of the group of transmissions of the first transmission is not to be considered (e.g., the WTRU does not reserve any power) when allocating power to a second transmission. The power level of the group of transmissions of the first transmission might not be considered for various reasons. These reasons may include an absence of scheduling information for the "scheduled" first transmission and/or the scheduling information is not available prior to a time corresponding to when to determine the "possible overlap duration" associated with the transmission opportunity corresponding to the first transmission.

C.4) Representative Power Allocation and Transmission Formats

In a representative embodiment, the WTRU may prioritize transmissions based on the transmission format. For example, the WTRU may prioritize a first PUCCH format as a higher priority than a second PUCCH format, for example, when allocating transmission power to the first and second PUCCHs. In another representative embodiment, the WTRU may prioritize transmissions based on a type of transmissions and their respective transmission formats. For example, the WTRU may prioritize a first transmission of an uplink control channel, e.g., of the PUCCH type using a first PUCCH format as a higher priority than a second transmission type of an uplink data channel, e.g., of a PUSCH type without any uplink control information. Alternatively, the WTRU may prioritize a first transmission of an uplink data channel, e.g., of the PUSCH type with uplink control information as a higher priority than a second transmission type of an uplink control channel, e.g., of a PUCCH type using a second PUCCH format.

In some representative embodiments, the WTRU may select a transmission format for a given type of transmission (e.g., a PUCCH transmission) as a function of the power allocation. For example, the WTRU may select a PUCCH format with a specific number of uplink control information bits such as a number of bits sufficient for reporting HARQ feedback per code block group (e.g., CBG-based feedback). For another example, the WTRU may select the PUCCH format based on the CBG-based feedback, e.g., when the WTRU determines that allocation of power to such a transmission does not lead to the WTRU scaling the transmission power, e.g., for at least any transmission of the same group of transmissions and/or for any transmission that at least partially overlaps with the concerned PUCCH transmission; and/or the WTRU may select a PUCCH format with fewer number of uplink control information bits, e.g., such as a number that corresponds to HARQ feedback per transport block (TB).

Representative Exemplary Outcomes of the Above-Principles for Adjustments of Guaranteed Levels In various embodiments, a WTRU may determine that a group of transmission has been using less than the guaranteed power for the group over a certain period of time, and may decrease gradually the guaranteed level, e.g., down to a certain minimum level (which may be a configuration for the WTRU).

Similarly, the WTRU may determine that a group of transmission has been using (e.g., from an assignment of the remaining power) more than the guaranteed power for the group over a certain period of time, and may increase gradually the guaranteed level, e.g., possibly up to a certain maximum level (which may be a configuration aspect for the WTRU).

In various embodiments, the WTRU may perform the determination that a group of transmission has been using less or more than the guaranteed power for the group based on scaling events occurring for the group of transmissions. It may be possible that scaling may not be applied to some of the group of transmissions during the same period of time. In other embodiments, the WTRU may receive downlink control signaling that indicates either by stepwise adjustments or by absolute values (e.g., based on an index to a value received in a DCI) to further adjust the power levels. The portion of the available power that remains unassigned following the dynamic adjustments may be assigned to the remaining power (if any).

In various embodiments, the WTRU may determine that a scaling event has occurred for one group of transmissions. In this case, the WTRU may assign the portion of the remaining power to the group of transmissions. In other embodiments, the WTRU may perform the assignment for a certain amount of time, e.g., for a time that corresponds to the completion of the transmissions for which scaling first occurred. In another embodiment, the WTRU may perform the assignment after a specific amount of time, e.g., after a time that corresponds to the earliest possible scheduling opportunity for the group of transmissions.

In various embodiments, the WTRU may determine that a scaling event for a first group of transmissions may lead to the guaranteed levels of other groups of transmissions reverting to a specific level (e.g., a backoff). In an embodiment, this may be useful such that there may be more remaining power to contend for and/or to allow for the first group of transmissions for subsequent transmissions such that it may increase its guaranteed level.

Figure 9:
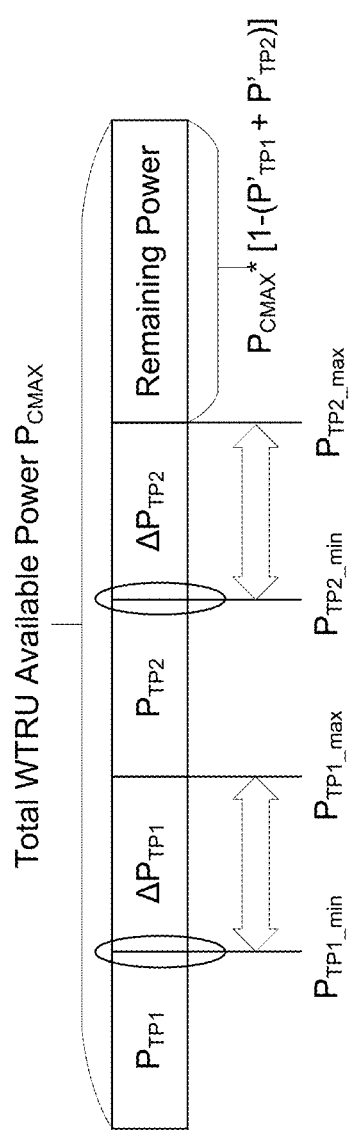
FIG. 9 is a diagram illustrating a representative dynamic uplink power control procedure having a varying remaining power.

Representative Outcomes of the Above Principles for Adjustments of Guaranteed Levels FIG. 9 is a diagram illustrating a representative dynamic uplink power control procedure having a varying remaining power. The representative dynamic uplink power control procedure illustrated in FIG. 9 may be applicable, for example, in the case of uncoordinated scheduling for transmissions associated with different TPs (e.g., for uncoordinated TPs). Referring to FIG. 9, the power (e.g., each power) reserved for each group of transmissions shown is denoted as $P_{TP1}$ and $P_{TP2}$, respectively. The total WTRU available power is denoted as $P_{CMAX}$. $P_{TP1}$ and $P_{TP2}$ may vary within a range, for example, by $\Delta P_{TP1}$ and $\Delta P_{TP2}$, respectively. $\Delta P_{TP1}$ may be a power difference between a maximum power for TP1 and a minimum power for TP1. $\Delta P_{TP2}$ may be a power difference between a maximum power for TP2 and a minimum power for TP2. Such variation may be performed according to any of the procedures/operations disclosed herein, for example, based on reception of a DCI and/or its contents, scheduling activity, radio link quality, beam link quality, additional power increase operations/procedures/methods, and/or multiplicative decrease operations/procedures/methods, or the like. In other representative embodiments, an amount of remaining power may vary. For example, one or more TPs may trade power levels (e.g., up to their respective $\Delta P_{TP}$) to or from the remaining power amount while adjusting (e.g., increasing or decreasing) their power levels within their respective guaranteed range(s). The remaining power may then be decreased, for example, in favor of the most active TP. For example, the remaining power may be calculated as follows:

The remaining power=$P_{CMAX}*[1-(P'_{TP1}+P'_{TP2})]$, wherein $P'_{TP1}$ is an actual transmission power for TP1 and $P'_{TP2}$ is an actual transmission power for TP2.

Figure 10:
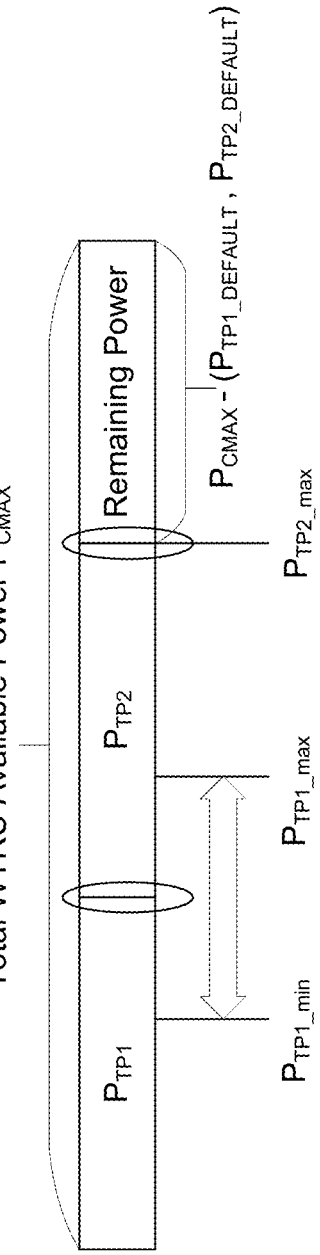
FIG. 10 is a diagram illustrating a representative dynamic uplink power control procedure having a constant remaining power.

Representative Outcomes of the Above Principles for Adjustments of Guaranteed Levels FIG. 10 is a diagram illustrating a representative dynamic uplink power control procedure having a constant remaining power. The representative dynamic uplink power control procedure illustrated in FIG. 10 may be applicable, for example, in the case of coordinated scheduling for transmissions associated with different TPs (e.g., for coordinated TPs). Referring to FIG. 10, the power (e.g., each power) reserved for each group of transmissions is denoted as $P_{TP1}$ and $P_{TP2}$, respectively. The total WTRU available power is denoted as $P_{CMAX}$. $P_{TP1}$ may vary within a range between a maximum power boundary for TP1 and a minimum power boundary for TP1. $P_{TP2}$ may vary within a range between a maximum power boundary for TP2 and a minimum power boundary for TP2 (not shown in FIG. 10). The variation within the range may be performed according to any of the operation/procedures/methods disclosed herein, for example based on reception of a DCI and/or its contents, scheduling activity, radio link quality, beam link quality, additional power increase operation/procedures/methods, and/or multiplicative decrease operation/procedures/methods, or the like. In other representative embodiments, an amount of remaining power may be fixed and/or semi-fixed. For example, a plurality of TPs may trade power levels (and/or may trade incremental power levels between each other and/or among one another while possibly adjusting (e.g., increasing or decreasing) their power levels within their respective allowed guaranteed power level range. The remaining power may then remain constant. In such case, a non-zero amount of remaining power may ensure quick reactiveness for the allocation of power to the higher priority group of transmissions. For example, the remaining power may be calculated as follows:

The remaining power=$P_{CMAX}-(P_{TP1\_DEFAULT}, P_{TP2\_DEFAULT})$, wherein $P_{TP1\_DEFAULT}$ is an initial minimum guaranteed power for TP1 and $P_{TP2\_DEFAULT}$ is an initial minimum guaranteed power for TP2.

Although only two TPs are shown, the procedure and remaining power may be used with any number of TPs, for example by modifying the formula for remaining power to include an appropriate number of adjustment (e.g., reductions) for the number of coordinated TPs.

Representative Outcomes of the Above Principles for Adjustments of Guaranteed Levels In some representative embodiments, the WTRU may be configured with a PCM characterized by: (1) a grouping of transmissions based on, e.g., a Transmission Profile (a TP) including any of: BWP, TTI, and/or RTT, among others; (2) an initial minimum guaranteed power $P_{TP\_DEFAULT}$ (e.g., configured by the RRC) for the configured (e.g., each configured) $TP_i$; (3) a range of power levels ($P_{TP\_min}$, and/or $P_{TP\_max}$) for the minimum guaranteed power per TP, or for one TP (e.g., only for one TP) (e.g., for $P_{TP1}$ and/or $P_{TP2}$ in FIG. 10); and/or (4) $P_{TP\_min} \le P_{TP\_DEFAULT} \le P_{TP\_max}$, among others.

In some representative embodiments, the WTRU may receive downlink control signaling (e.g., DCI and/or, one or more MAC CEs) that may indicate the guaranteed power level for $TP_x$ ($P_{TPx}$). The WTRU may adjust the guaranteed power levels $P'_{TPx}$ according to any of the following: (1) $P_{TPx\_min} \le P'_{TPx} \le P_{TPx\_max}$; (2) for constant remaining power as illustrated in FIG. 10, for example, the WTRU may increase or decrease $P'_{TPx}$ by assigning guaranteed power to another TP or by taking guaranteed power from the other TP; and/or (3) for variable remaining power as illustrated in FIG. 9, the WTRU may increase or decrease $P'_{TPx}$ by assigning guaranteed power to the remaining power or by taking guaranteed power from the remaining power.

In some representative embodiments, the WTRU may allocate a power to transmissions of different TP groups, for example, such that: (1) the sum of all transmission power of a group becomes $P'_{TP}$; and/or (2) the sum of all $P'_{TP}$ becomes less than or equal to $P_{CMAX}$ (e.g., at all time).

In other representative embodiments, the WTRU may adjust (e.g., autonomously adjust) the guaranteed power levels $P'_{TP}$ within the range of power levels [$P_{TP\_min}$, $P_{TP\_max}$] as a function of the scheduling activity, for example, the WTRU may increase $P'_{TP}$ when the WTRU determines a higher DCI rate for a certain TP, or decrease $P'_{TP}$, otherwise.

Conclusion

Although features and elements are described above in particular combinations, one of ordinary skill in the art will appreciate that each feature or element can be used alone or in any combination with the other features and elements. In addition, the methods disclosed herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments disclosed above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the disclosed methods.

In an illustrative embodiment, any of the operations, processes, etc. disclosed herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies disclosed herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

The present disclosure is not to be limited in terms of the particular embodiments disclosed in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as disclosed infra; (ii) any of a number of embodiments of a WTRU, such as disclosed infra; (iii) a wireless-capable and/or wired-capable (e.g., tetherable) device configured with, inter alia, some or all structures and functionality of a WTRU, such as disclosed infra; (iii) a wireless-capable and/or wired-capable device configured with less than all structures and functionality of a WTRU, such as disclosed infra; or (iv) the like. Details of an example WTRU, which may be representative of any WTRU recited herein, are provided herein with respect to FIG. 1.

In certain representative embodiments, several portions of the subject matter disclosed herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter disclosed herein may be distributed as a program product in a variety of forms, and that an illustrative embodiment of the subject matter disclosed herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein disclosed subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of followed by a listing of" a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and disclosed herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

What is claimed is:

1. A method, implemented in a wireless transmit/receive unit (WTRU), directed to power allocation, the method comprising:
    identifying, from a plurality of transmissions, first and second groups of transmissions for transmission by the WTRU during first and second transmission opportunities, wherein the second transmission opportunity occurs on a second spectrum for which a listen-before-talk (LBT) mechanism is utilized for channel access, and wherein the first transmission opportunity occurs on a first spectrum for which an LBT mechanism is not utilized for channel access;
    determining a likelihood of transmitting any of the second group of transmissions during the second transmission opportunity based on scheduling information;
    on condition that the likelihood satisfies a configured threshold, determining a portion of available power to be reserved for use during the second transmission opportunity;
    determining a first power level for the first group of transmissions based, at least in part, on excluding the portion of available power reserved for use during the second transmission opportunity; and
    transmitting at least one of the first group of transmissions at least at the first power level during the first transmission opportunity.

2. The method of claim 1, wherein the first transmission opportunity comprises first time resources, wherein the second transmission opportunity comprises second time resources, and wherein at least some of the first and second time resources overlap.

3. The method of claim 2, wherein the first time resources define a first start time and a first duration, and wherein the second time resources define a second start time and a second duration.

4. The method of claim 1, wherein the first spectrum comprises licensed spectrum, and wherein the second spectrum comprises unlicensed spectrum.

5. The method of claim 1, further comprising:
    on condition that at least one of the second group of transmissions is to be transmitted during the second transmission opportunity, determining a second power level for the at least one of the second group of transmissions based, at least in part, on the portion of available power reserved for use during the second transmission opportunity.

6. The method of claim 5, further comprising:
    determining whether the second power level exceeds a second guaranteed power level associated with the second group of transmissions; and
    on condition that the second power level exceeds the second guaranteed power level, adjusting any of a first guaranteed power level associated with the first group of transmissions and a remaining power level, wherein the remaining power level corresponds to a difference between a maximum power and the first and second guaranteed power levels combined.

7. The method of claim 6, further comprising:
    determining whether the first power level exceeds the first guaranteed power level; and
    on condition that the first power level exceeds the first guaranteed power level, adjusting any of the second guaranteed power and the remaining power level.

8. The method of claim 1, further comprising:
    determining whether the first power level exceeds a first guaranteed power level associated with the first group of transmissions; and
    on condition that the first power level exceeds the first guaranteed power level, adjusting any of a second guaranteed power level associated with the second group of transmissions and a remaining power level, wherein the remaining power level corresponds to a difference between a maximum power and the first and second guaranteed power level combined.

9. The method of claim 1, wherein identifying the first group of transmissions comprises identifying transmissions based on one or more first characteristics of the first transmission opportunity and one or more second characteristics of the second transmission opportunity.

10. The method of claim 1, further comprising:
    determining at least some of the scheduling information after channel acquisition on the second spectrum.

11. A wireless transmit/receive unit (WTRU) comprising circuitry, including a transmitter, receiver, processor and memory, configured to:
    identify, from a plurality of transmissions, first and second groups of transmissions for transmission by the WTRU during first and second transmission opportunities, wherein the second transmission opportunity occurs on a second spectrum for which a listen-before-talk (LBT) mechanism is utilized for channel access, and wherein the first transmission opportunity occurs on a first spectrum for which an LBT mechanism is not utilized for channel access;

determine a likelihood of transmitting any of the second group of transmissions during the second transmission opportunity based on scheduling information;

on condition that the likelihood satisfies a configured threshold, determine a portion of available power to reserve for use during the second transmission opportunity;

determine a first power level for the first group of transmissions based, at least in part, on excluding the portion of available power reserved for use during the second transmission opportunity; and transmit at least one of the first group of transmissions at least at the first power level during the first transmission opportunity.

12. The WTRU of claim 11, wherein the first transmission opportunity comprises first time resources, wherein the second transmission opportunity comprises second time resources, and wherein at least some of the first and second time resources overlap.

13. The WTRU of claim 12, wherein the first time resources define a first start time and a first duration, and wherein the second time resources define a second start time and a second duration.

14. The WTRU of claim 11, wherein the first spectrum comprises licensed spectrum, and wherein the second spectrum comprises unlicensed spectrum.

15. The WTRU of claim 11, wherein the circuitry is configured to:
determine a second power level for the second group of transmissions based, at least in part, on the portion of available power reserved for use during the first transmission opportunity on condition that at least one of the second group of transmissions is to be transmitted during the second transmission opportunity.

16. The WTRU of claim 15, wherein the circuitry is configured to:
determine whether the second power level exceeds a second guaranteed power level associated with the second group of transmissions; and
adjust any of a first guaranteed power level associated with the first group of transmissions and a remaining power level on condition that the second power level exceeds the second guaranteed power level, wherein the remaining power level corresponds to a difference between a maximum power and the first and second guaranteed power levels combined.

17. The WTRU of claim 16, wherein the circuitry is configured to:
determine whether the first power level exceeds the first guaranteed power level; and
adjust any of the second guaranteed power and the remaining power level on condition that the first power level exceeds the first guaranteed power level.

18. The WTRU of claim 11, wherein the circuitry is configured to:
determine whether the first power level exceeds a first guaranteed power level associated with the first group of transmissions; and
adjust any of a second guaranteed power level associated with the second group of transmissions and a remaining power level on condition that the first power level exceeds the first guaranteed power level, wherein the remaining power level corresponds to a difference between a maximum power and the first and second guaranteed power level combined.

19. The WTRU of claim 11, wherein the circuitry is configured to identify the first group of transmissions based on one or more first characteristics of the first transmission opportunity and one or more second characteristics of the second transmission opportunity.

20. The WTRU of claim 11, further comprising:
determining at least some of the scheduling information after channel acquisition on the second spectrum.

* * * * *